US006015628A

United States Patent [19]

Urata et al.

[11] Patent Number: 6,015,628

[45] Date of Patent: Jan. 18, 2000

[54] ORGANIC COMPOSITE COATED STEEL SHEET WITH GOOD PRESS FORMABILITY AND PERFORATION CORROSION RESISTANCE

[75] Inventors: Kazuya Urata; Naoto Yoshimi; Takahiro Kubota; Masaaki Yamashita, all of Tokyo; Yasuhiko Haruta, Hiratsuka, all of Japan

[73] Assignee: NKK Corporation, Tokyo, Japan

[21] Appl. No.: 08/809,766

[22] PCT Filed: Jul. 31, 1996

[86] PCT No.: PCT/JP96/02156

§ 371 Date: Jun. 18, 1997

§ 102(e) Date: Jun. 18, 1997

[87] PCT Pub. No.: WO97/04957

PCT Pub. Date: Feb. 13, 1997

[30] Foreign Application Priority Data

Jul. 31, 1995 [JP] Japan .................................... 7-214063

[51] Int. Cl.$^{7}$ .......................... B21D 39/00; C03C 27/02; B32B 27/38

[52] U.S. Cl. .......................... 428/623; 428/626; 428/632; 428/659; 428/684; 428/413

[58] Field of Search .................................... 428/623, 626, 428/632, 659, 684, 413, 418

[56] References Cited

U.S. PATENT DOCUMENTS

| | | | |
|---|---|---|---|
| 4,775,600 | 10/1988 | Adaniya et al. | 428/623 |
| 4,876,160 | 10/1989 | Shindou et al. | 428/623 |
| 5,061,575 | 10/1991 | Mohri et al. | 428/623 |
| 5,102,746 | 4/1992 | Shindou et al. | 428/623 |

FOREIGN PATENT DOCUMENTS

| | | |
|---|---|---|
| 60-94466 | 5/1985 | Japan . |
| 64-8033 | 1/1989 | Japan . |
| 2-43040 | 2/1990 | Japan . |
| 3-2257 | 1/1991 | Japan . |
| 3-284942 | 12/1991 | Japan . |
| 5-65666 | 3/1993 | Japan . |
| 5-65667 | 3/1993 | Japan . |
| 5-237449 | 9/1993 | Japan . |
| 5-255587 | 10/1993 | Japan . |
| 6-57440 | 3/1994 | Japan . |
| 6-173037 | 6/1994 | Japan . |
| 7-163940 | 6/1995 | Japan . |
| 7-185453 | 7/1995 | Japan . |

OTHER PUBLICATIONS

Galvatech '92 "The Corrosion Resistance of Organic Composite–Caoted Steel Sheets"; Toshiaki Shiota, et al. pp. 372–376.

Copy of the International Search Report dated Sep. 24, 1996.

*Primary Examiner*—D. S. Nakarani
*Assistant Examiner*—Holly C Rickman
*Attorney, Agent, or Firm*—Nields, Lemack & Dingman

[57] ABSTRACT

This invention provides an organic composite coated steel sheet comprising, as the base, a zinc or zinc alloy coated steel sheet, which can be used in automobile bodies and electric appliances. The coated steel sheet has excellent press formability with oil, while having excellent perforation corrosion resistance and excellent corrosion resistance in a rust-contaminated environment. The coated steel sheet comprises a zinc or zinc alloy plated steel sheet having, on its surface, a chromate layer and an organic film formed in that order, in which the organic film has a thickness of from 0.1 to 3.0 μm and comprises (i) an epoxy resin mixture composed of a base resin as prepared by adding at least one basic nitrogen atom and at least two primary hydroxyl groups to the ends of an epoxy resin, and a curing agent for the resin of a polyisocyanate compound, as mixed in a particular ratio by weight of the two, (ii) a composite lubricant comprising a polyolefin wax as prepared through coordination-anionic polymerization using a Ziegler catalyst, and fine powder of a fluorine resin, as combined in a particular ratio by weight of the two, and (iii) a rust preventive additive, as combined in a particular ratio of (i), (ii) and (iii).

33 Claims, 4 Drawing Sheets

ORGANIC COMPOSITE COATED STEEL SHEET WITH GOOD PRESS FORMABILITY AND PERFORATION CORROSION RESISTANCE

TECHNICAL FIELD

The present invention relates to an organic composite coated steel sheet comprising, as the substrate base, a zinc or zinc alloy plated steel sheet, which can be used in automobile bodies and electric appliances. The organic composite coated steel sheet of the invention has good press formability, while being coated with oil, and has high perforation corrosion resistance and even high resistance to corrosion in a corrosive environment in which iron rust is present (hereinafter referred to as "corrosion resistance in a rust-contaminated environment").

BACKGROUND ART

In the step of machining steel sheets under pressure to produce automobile bodies or the like, high-viscosity press oil is scarcely used, since the steel sheets being machined in the step require efficient working, degreasing and chemical treatment. In general, therefore, the rust preventing oil coated on the steel sheets is directly used as the press oil. However, such is problematic in that the machining of the parts with complicated shapes often result in press cracking and other troubles. In order to solve the problems, expensive materials having a high mean-r value (that is, having good press formability) are employed at present in the art. Given the situation, therefore, it is desired to develop inexpensive materials with good press formability which can be machined under pressure to give any parts with complicated shapes.

On the other hand, in the field of electric appliances, steel sheets are machined in the presence of press oil, and the machined products are degreased with a freon-type solvent before use. However, the freon-type solvent is a chemical that destroys the ozone layer around the earth, and the working environment where press oil is used is not good for factory workers. For these reasons, the recent tendency is toward the development of organic composite coated steel sheets capable of being press-formed in the absence of oil.

Under the situation mentioned above, various organic composite coated steel sheets such as those mentioned below have heretofore been proposed.

(1) Japanese Patent Application laid open (KOKAI) under No. Sho 64-8033 discloses an organic composite coated steel sheet, which comprises a Zn or Zn alloy plated steel sheet having on its surface a first chromate film and a second organic film of an amine-modified epoxy resin containing silica or a chromate, in that order.

(2) Japanese Patent Application laid open (KOKAI) under No. Hei 3-284942 discloses an organic resin-coated, galvannealed steel sheet in which the organic film contains silica or a fine powder of a fluorine resin to thereby improve the anti-powdering property and the anti-flaking property of the steel sheet.

(3) Japanese Patent Application laid open (KOKAI) under No. Hei 6-173037 discloses an organic composite coated steel sheet in which the organic film contains an ether-ester type urethane resin, an epoxy resin, silica and a polyolefin wax.

(4) Japanese Patent Application laid open (KOKAI) under No. Hei 5-237449 discloses an organic composite coated steel sheet, which comprises a zinc or zinc alloy plated steel sheet having on its surface a first chromate film and a second organic film in that order, and in which the second organic film comprises a resin having hydroxyl and/or carboxyl groups, large particles of a polyolefin wax (having a mean particle size of from 3.0 to 5.0 $\mu$m), small particles of a polyolefin wax (having a mean particle size of 1.0 $\mu$m or smaller) and silica.

(5) Japanese Patent Application laid open (KOKAI) under No. Hei 5-65667 discloses an organic composite coated steel sheet, which comprises a zinc or zinc alloy plated steel sheet having on its surface a first chromate film and a second organic film in that order, and in which the second organic film comprises an aqueous resin, silica and two different polyolefin waxes with a molecular weight of from 1000 to 4000, one polyolefin wax having a softening point of 120° C. or lower while the other having a softening point of higher than 120°.

(6) Japanese Patent Application laid open (KOKAI) under No. Hei 6-59455 discloses an organic composite coated steel sheet, which comprises a zinc or zinc alloy plated steel sheet having on its surface a first chromate film and a second organic film in that order, and in which the second organic film comprises an organic resin, silica and a solid crystalline lubricant (of which 10% or more is a high-melting-point, large-particulate lubricant comprising large particles having particle sizes of 20 $\mu$m or larger and a high melting point of 120° C. or higher).

(7) Japanese Patent Application laid open (KOKAI) under No. Hei 5-255587 discloses an organic composite coated steel sheet, comprising a cold-rolled steel sheet or a zinc or zinc alloy plated steel sheet of which the surface is treated through some surface treatment and coated with an organic film that comprises a water-dispersible polyurethane resin, silica, and a polyolefin wax and/or a fine powder of a fluorine resin.

(8) Japanese Patent Application laid open (KOKAI) under No. Hei 6-57440 discloses an organic composite coated steel sheet, which comprises a zinc or zinc alloy plated steel sheet or an aluminium or aluminium alloy plated steel sheet having on its surface a first chromate layer and a second layer of an organic film in that order, and in which the organic film comprises a carboxyl-modified epoxy resin or a polyvinyl butyral resin, silica, a polyethylene wax and a fine powder of a tetrafluoroethylene resin.

(9) Japanese Patent Application laid open (KOKAI) under No. Hei 5-65666 discloses an organic composite coated steel sheet, which comprises a zinc or zinc alloy plated steel sheet having on its surface a first chromate layer and a second layer of an organic film in that order, and in which the organic film comprises an aqueous resin, silica, a dispersion of a polyolefin wax with polar groups having a molecular weight of from 1000 to 4000 and having a softening point of 150° C. or lower (particle size: 3.0 $\mu$m or smaller) and a Teflon dispersion (particle size: 3.0 $\mu$m or smaller).

(10) Japanese Patent Application laid open (KOKAI) under No. Hei 2-43040 discloses an organic composite coated steel sheet, which comprises a zinc or zinc alloy plated steel sheet having on its surface a first chromate layer and a second layer of an organic film in that order, and in which the organic film comprises a carboxyl-modified epoxy resin or a polyvinyl butyral resin, silica, a polyolefin wax having a melting point of 70° C. or higher and a fine powder of a fluorine resin (particle size: 1.0 to 7.0 $\mu$m).

(11) Japanese Patent Application laid open (KOKAI) under No. Hei 3-2257 discloses an organic composite coated steel sheet, which comprises a cold-rolled steel sheet or a zinc or zinc alloy plated steel sheet having on its surface a first phosphate or chromate film and a second organic film in that order, and in which the second organic film comprises an epoxy resin, silica, a polyolefin wax having a melting point of 110° C. or higher (mean particle size: 2.0 to 5.0 $\mu$m, specific gravity: 0.94 to 0.98) and a fine powder of a fluorine resin.

However, the above-mentioned, conventional, organic composite coated steel sheets are all problematic, for example, in the following points.

In the organic composite coated steel sheet of the above-mentioned (1), the organic film is effective for preventing the adhesion of the plated base sheet to a press mold in some degree. In this, however, since the organic film does not specifically contain any lubricant, the lubricative property of the organic film coated sheet is not superior to that of the plated base sheet. Thus, since there is no improvement in the lubricative property of the sheet (1), the press formability thereof is not improved to such a degree that the sheet (1) may be graded up to a one-rank higher one.

For the organic composite coated steel sheet of the above-mentioned (2), the anti-powdering property and the anti-flaking property of the galvannealed steel sheet base thereof may be improved in some degree. However, the ability of the sheet (2) to adhere to a film as formed thereon through cationic electrodeposition is somewhat poor. In addition, since only fine powder of an ordinary fluorine resin is in the organic film as the lubricant, the organic film could not bring about the improvement in the press formability of the sheet (2) to such a degree that the sheet (2) may be graded up to a one-rank higher one.

In the organic composite coated steel sheets of the above-mentioned (3), (4) and (5), one or more different polyolefin waxes are in the organic film as the lubricant. Therefore, the lubricative property of these sheets is good in oil-free forming. However, if these sheets are formed into automobile bodies or the like, while being coated with a rust preventive oil or with a wash oil, such polyolefin waxes could not exhibit by themselves satisfactory lubrication as in oil-free forming. In such forming with oil, the organic films of these sheets could not bring about the improvement in the press formability of these sheets to such a degree that the sheets may be graded up to one-rank higher ones.

The lubricative property of the organic composite coated steel sheets of the above-mentioned (6) and (8) is good in oil-free press forming. In these sheets, however, the lubricant in the organic film comprises an ordinary polyolefin wax or fine powder of an ordinary fluorine resin. Therefore, if these sheets are formed into automobile bodies or the like, while being coated with a rust preventive oil or with a wash oil, their lubrication is not good as in oil-free forming. In such forming with oil, the organic films of these sheets could not bring about the improvement in the press formability of these sheets to such a degree that the sheets may be graded up to one-rank higher ones. In addition, the ordinary, fine-powdery fluorine resin used in these sheets as the lubricant is defective in that its dispersion stability in coating compositions is poor.

For the organic composite coated steel sheets of the above-mentioned (7) and (9), their press formability in oil-free conditions is improved. However, since the organic films of these sheets comprise a water-soluble or water-dispersible resin, they are defective in that they easily absorb water in a corrosive environment or in a wet environment, resulting in poor corrosion resistance of the sheets and poor paint adhesion to the sheets. In addition, since the organic films of these sheets comprises an ordinary polyolefin wax or fine powder of an ordinary fluorine resin as the lubricant, the lubricative property of the sheets is poor in forming with oil, being different from that in oil-free forming. Thus, the organic films of these sheets could not bring about the improvement in the press formability of these sheets to such a degree that the sheets may be graded up to one-rank higher ones.

The lubricative property of the organic composite coated steel sheets of the above-mentioned (10) and (11) is good in oil-free press forming. In these sheets, however, since the lubricant in the organic film comprises fine powder of an ordinary fluorine resin, the lubricative property of the sheets is poor in forming with oil, being different from that in oil-free forming. Thus, the organic films of these sheets could not bring about the improvement in the press formability of these sheets to such a degree that the sheets may be graded up to one-rank higher ones. In addition, the ordinary, fine-powdery fluorine resin used in these sheets as the lubricant is defective in that its dispersion stability in coating compositions is poor.

Attention has lately come to be drawn to corrosion resistance in a corrosive environment in which iron rust is present (hereinafter referred to as "corrosion resistance in a rust-contaminated environment") [CAMP-ISIJ, Vol. 5 (1992), p. 1693]. It has been pointed out that the exposure of an organic composite coated steel sheet to such a rust-contaminated environment results in iron rust adhering to the surface of its organic resin film, thereby causing a great reduction in its intrinsic, excellent corrosion resistance to such an extent that the thus-exposed sheet is no longer appreciably superior in corrosion resistance to any ordinary zinc or zinc alloy plated steel sheet having no organic resin film thereon. Therefore, it is desired to make organic composite coated steel sheets have further improved corrosion resistance even in a rust-contaminated environment. However, the level of the corrosion resistance of the conventional organic composite coated steel sheets, such as those of the above-mentioned (1) to (11), in a rust-contaminated environment is not still satisfactory.

GALVATECH '92 (p. 372) states that there was obtained an organic composite coated steel sheet having a lower corrosion resistance in a rust-contaminated environment when the crosslinking density of its organic resin film was lowered by reducing the amount of the crosslinking agent added to the organic resin constituting the film. It however, fails to describe any specific means for improving the corrosion resistance of the organic composite coated steel sheet in a rust-contaminated environment, though the above statement may suggest that the increase in the crosslinking density of the organic resin film may result in the improvement in the corrosion resistance of the sheet in a rust-contaminated environment.

Having taken these problems in the prior art into consideration, we, the present inventors have made the present invention, of which the object is to realize the improvement in the press formability of an organic composite coated steel sheet to that of a one-rank higher one (by about 0.2 in terms of the mean-r value of the sheet) by improving the lubricative property of the organic film to be formed on the surface of the sheet, while improving the perforation corrosion resistance of the sheet and even the corrosion resistance thereof in a rust-contaminated environment.

DISCLOSURE OF THE INVENTION

We, the present inventors have assiduously studied the relationships between the film constitution of an organic composite coated steel sheet and the press formability thereof, the perforation corrosion resistance thereof and the corrosion resistance thereof in a rust-contaminated environment, and, as a result, have achieved the following findings.

First, for the improvement in the perforation corrosion resistance of an organic composite coated steel sheet, we have found that the use of a particular, solvent-type epoxy resin as the base resin in the organic film, as combined with the use of a polyisocyanate compound as the curing agent for the organic film, is extremely effective for attaining the improvement in the perforation corrosion resistance of the sheet and also the improvement in the paint adhesion to the sheet. We have further found that the addition of a rust preventive additive comprising a combination of silica and a sparingly soluble chromate to the organic film brings about further improvement in the perforation corrosion resistance of the organic composite coated steel sheet.

Moreover, regarding the press formability of an organic composite coated steel sheet in the presence of oil, we have found the following facts.

(a) In oil-free press forming, preferred is a polyolefin wax as the lubricant in the organic film of an organic composite coated steel sheet, as exhibiting excellent lubrication. However, where the sheet is press-formed into automobile bodies or the like, while being coated with a rust preventive oil or wash oil, the single use of an ordinary polyolefin wax could not produce any excellent lubrication as in oil-free forming. As opposed to this, the addition to the organic film of a particular polyolefin wax as combined with fine powder of a fluorine resin in a particular ratio produces excellent lubrication even in forming of the sheet with oil.

(b) As the polyolefin wax to be combined with fine powder of a fluorine resin, preferred is a polyolefin wax (especially, polyethylene wax) to be produced through coordination-anionic polymerization using a Ziegler catalyst, as producing more excellent lubrication. In particular, the use of a polyethylene wax having a particular softening point and a particular molecular weight produces much more excellent lubrication.

(c) As the fine powder of a fluorine resin to be combined with the polyolefin wax, preferred is fine powder of a tetrafluoroethylene resin, as producing more excellent lubrication. In particular, the use of fine powder of a OF tetrafluoroethylene resin having a molecular weight not higher than a predetermined value is the best, as producing the most excellent lubrication. Further, the use of fine powder of a tetrafluoroethylene resin having a specific surface area not larger than a predetermined value is preferred, since the dispersion stability of the fine powder in coating compositions is good.

Regarding the corrosion resistance of an organic composite coated steel sheet in a rust-contaminated environment, we have found that the increase in the crosslinking density of the organic film to be attained by the addition to the film of a polyfunctional polyisocyanate compound as the curing agent, and the addition to the organic film of silica as combined with a sparingly soluble chromate in a particular ratio, as the rust preventive additive are extremely effective for achieving the excellent corrosion resistance of the sheet in a rust-contaminated environment.

The present invention has been completed on the basis of these findings, and is characterized by the following constitutions.

[1] An organic composite coated steel sheet with excellent press formability and excellent perforation corrosion resistance, which comprises a zinc or zinc alloy plated steel sheet having on its surface a first chromate layer having a coating weight of from 5 to 200 mg/m$^2$ in terms of metallic chromium, and a second layer of an organic film having a thickness of from 0.1 to 3.0 $\mu$m, in that order, and in which said organic film comprises an epoxy resin mixture of the following (i), a lubricant of the following (ii) and a rust preventive additive, in such a ratio by weight, in terms of the non-volatile contents, that the epoxy resin mixture is from 30 to 80% by weight, the lubricant is from 3 to 50% by weight and the rust preventive additive is from 3 to 50% by weight:

(i) an epoxy resin mixture composed of a base resin (A) as prepared by adding at least one basic nitrogen atom and at least two primary hydroxyl groups to the ends of an epoxy resin, and a curing agent for (A) of a polyisocyanate compound (B), as mixed in a ratio by weight, A/B, of being from 95/5 to 65/45 (in terms of the non-volatile contents); and (ii) a composite lubricant composed of a polyolefin wax (C) as prepared through coordination-anionic polymerization using a Ziegler catalyst, and fine powder of a fluorine resin (D), as mixed in a ratio by weight, C/D, of being from 10/90 to 90/10.

[2] An organic composite coated steel sheet with excellent press formability and excellent perforation corrosion resistance, which comprises a zinc or zinc alloy plated steel sheet having on its surface a first chromate layer having a coating weight of from 5 to 200 mg/m$^2$ in terms of metallic chromium, and a second layer of an organic film having a thickness of from 0.1 to 3.0 $\mu$m, in that order, and in which said organic film comprises an epoxy resin mixture of the following (i), a lubricant of the following (ii) and a rust preventive additive, in such a ratio by weight, in terms of the non-volatile contents, that the epoxy resin mixture is from 30 to 80% by weight, the lubricant is from 3 to 50% by weight and the rust preventive additive is from 3 to 50% by weight:

(i) an epoxy resin mixture composed of a base resin (A) as prepared by adding at least one basic nitrogen atom and at least two primary hydroxyl groups to the ends of an epoxy resin, and a curing agent for (A) of a polyisocyanate compound (B), as mixed in a ratio by weight, A/B, of being from 95/5 to 55/45 (in terms of the non-volatile contents); and (ii) a particulate lubricant (E) comprising both a polyolefin (C') as prepared through coordination-anionic polymerization using a Ziegler catalyst and a fluorine resin (D') in one particle; or a composite lubricant comprising said particulate lubricant (E), and a polyolefin wax (C) and/or fine powder of a fluorine resin (D), in which the ratio by weight of said polyolefin wax (C) and said polyolefin (C') to said fine-powdery fluorine resin (D) and said fluorine resin (D'), (C+C')/(D+D'), is from 10/90 to 90/10.

Of the organic composite coated steel sheet of the present invention having the above-mentioned constitution [1] or [2], preferred is any of the following embodiments [3] to [9] or any of combinations of these, as having especially excellent characteristics (in their press formability, perforation corrosion resistance and corrosion resistance in a rust-contaminated environment).

[3] In the organic composite coated steel sheet of the above-mentioned [1], fine powder of a tetrafluoroethylene resin that satisfies the following conditions (a) and (b) is used as the fine-powdery fluorine resin (D) to be in the organic film, thereby making the sheet have more excellent press formability.

(a) When tested in a method for testing its flow properties with a capillary rheometer under the conditions mentioned below, in accordance with JIS K7199, the apparent melt viscosity and the apparent rate of shear of the resin satisfy the following equation (1):

$$\log \eta \leqq A - B \log \gamma \quad (1)$$

in which;

A is 5.45;

B is 0.65;

$\eta$ is the apparent melt viscosity (poise) of the resin, provided that $\eta>0$; and $\gamma$ is the apparent rate of shear of the resin ($sec^{-1}$), provided that $5 \leqq \gamma \leqq 1300$.

Test Conditions:

Temperature: 330° C.

Diameter of Barrel: 9.55 mm

Dimension of Capillary:

Diameter, d=1 mm

Length, 1=10 mm

Inlet of Capillary: flat (b) The resin has a specific surface area of 11 $m^2/g$ or smaller, preferably 6 $m^2/g$ or smaller.

[4] In the organic composite coated steel sheet of the above-mentioned [2], a tetrafluoroethylene resin or fine powder of a tetrafluoroethylene resin that satisfies the following conditions (a) and (b) is used as the fluorine resin (D') constituting the lubricant (E) or the fine-powdery fluorine resin (D) to be in the organic film, thereby making the sheet have more excellent press formability.

(a) When tested in a method for testing its flow properties with a capillary rheometer under the conditions mentioned below, in accordance with JIS K7199, the apparent melt viscosity and the apparent rate of shear of the resin satisfy the following equation (1):

$$\log \eta \leqq A - B \log \gamma \quad (1)$$

in which;

A is 5.45;

B is 0.65;

$\eta$ is the apparent melt viscosity (poise) of the resin, provided that $\eta>0$; and $\gamma$ is the apparent rate of shear of the resin ($sec^{-1}$), provided that $5 \leqq \gamma \leqq 1300$.

Test Conditions:

Temperature: 330° C.

Diameter of Barrel: 9.55 mm

Dimension of Capillary:

Diameter, d=1 mm

Length, 1=10 mm

Inlet of Capillary: flat (b) The resin has a specific surface area of 11 $m^2/g$ or smaller, preferably 6 $m^2/g$ or smaller.

[5] In the organic composite coated steel sheet of the above-mentioned [1], a polyethylene wax having a molecular weight of from 700 to 4500 and a softening point of from 100 to 140° C., preferably a polyethylene wax having a molecular weight of from 1000 to 3500 and a softening point of from 110 to 130° C. is used as the polyolefin wax (C) to be in the organic film, thereby making the sheet have more excellent press formability.

[6] In the organic composite coated steel sheet of the above-mentioned [2], a polyethylene or polyethylene wax having a molecular weight of from 700 to 4500 and a softening point of from 100 to 140° C., preferably a polyethylene or polyethylene wax having a molecular weight of from 1000 to 3500 and a softening point of from 110 to 130° C. is used as the polyolefin (C') constituting the lubricant (E) or the polyolefin wax to be in the organic film, thereby making the sheet have more excellent press formability.

[7] In the organic composite coated steel sheet of the above-mentioned [1] or [2], a polyfunctional polyisocyanate compound having at least three isocyanato groups in one molecule, preferably a polyfunctional polyisocyanate compound having at least four isocyanato groups in one molecule, more preferably a polyfunctional polyisocyanate compound having at least six isocyanato groups in one molecule is used as the polyisocyanate compound (B) to be in the organic film, thereby making the sheet have more excellent corrosion resistance in a rust-contaminated environment. Most preferably, used therein is a polyfunctional hexamethylene diisocyanate having at least six isocyanato groups in one molecule, as the polyisocyanate compound to be in the organic film.

[8] In the organic composite coated steel sheet of the above-mentioned [1] or [2], at least one selected from silica and sparingly soluble chromates is used as the rust preventive additive to be in the organic film, thereby making the sheet have more excellent perforation corrosion resistance. Especially preferably, used therein as the rust preventive additive is a combination of silica and a sparingly soluble chromate in a ratio by weight, silica/sparingly soluble chromate, of from 90/10 to 10/90.

[9] In the organic composite coated steel sheet of the above-mentioned [1] or [2], formed on the organic film is a third layer of a rust preventive oil in a coating weight of from 0.01 to 10 $g/m^2$, thereby making the sheet have more excellent press formability.

BEST MODES OF CARRYING OUT THE INVENTION

Figure 1:
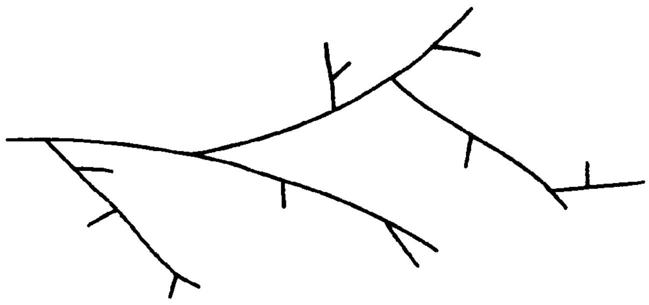
FIG. 1 graphically shows a molecular structure model of a polyolefin wax as prepared through radical polymerization using a radical catalyst or a polyolefin wax as prepared through pyrolysis of an ordinary shaping polyolefin.

Description will now be made of the details of the present invention and the reasons for the limitations made for defining it.

The base sheet, zinc or zinc alloy plated steel sheet for use in the present invention may be any and every formable cold rolled steel sheet, including, for example, commercial-quality, cold rolled steel sheets (CQ), drawing-quality, cold rolled steel sheets (DQ), deep-drawing-quality, cold rolled steel sheets (DDQ), and extra-deep-drawing-quality, cold rolled steel sheets (EDDQ). Where the sheet is prepared through electroplating, it may be annealed by either batch annealing or continuous annealing. As the base sheet, also employable herein is any of bake-hardenable, high-tension steel sheets of relatively low levels of strength, ordinary high-tension steel sheets with a strength of higher than 390 MPa, and de-scaled, hot rolled steel sheets. In particular, preferred are formable cold rolled steel sheets with relatively good press shapability, such as deep-drawing-quality, cold rolled steel sheets (DDQ) and extra-deep-drawing-quality, cold rolled steel sheets (EDDQ), as producing better results.

The plate layer of the zinc or zinc alloy plated steel sheet for use in the present invention may be made of, for example, Zn, Zn—Ni alloys (having an Ni content of from 10 to 15% by weight), Zn—Fe alloys (having an Fe content of from 5 to 25% by weight, or having an Fe content of from 60 to 90% by weight), Zn—Mn alloys (having an Mn content of from 30 to 80% by weight), Zn—Co alloys (having a Co content of from 3 to 15% by weight), Zn—Cr alloys (having a Cr content of from 6 to 30% by weight) or Zn—Al alloys(having an Al content of from 3 to 60% by weight). In order to improve the corrosion resistance of the plated steel sheets, the plating components may contain various alloying elements, such as Co, Fe, Ni and Cr; oxides and salts, such as silica, alumina and sparingly soluble chromates; polymers, etc.

If desired, the base steel sheet may be plated with a multi-layer consisting of two or more layers of the same or different compositions. The plating of the sheet can be effected by any method selected from electrodeposition, hot dipping and vapor-phase deposition on a case to case basis, though electrodeposition is the most advantageous as being applicable to most cold rolled steel strips.

The coating weight of the plate layer shall be 10 $g/m^2$ or larger. If it is smaller than 10 $g/m^2$, such is problematic in that the corrosion resistance of the plated steel sheet is poor.

For Zn—Ni alloy plate layers, Zn—Fe alloy plate layers, Zn—Mn alloy plate layers, Zn—Co alloy plate layers and Zn—Cr alloy plate layers, if the coating weight is larger than 60 $g/m^2$, the anti-powdering property of the plated steel sheets is poor. Therefore, for these, the coating weight is preferably from 10 to 60 $g/m^2$. In order to ensure higher corrosion resistance and higher powdering resistance, the coating weight is more preferably from 15 to 50 $g/m^2$.

For Zn—Ni alloy plating, preferred is the provision of an Ni plate interlayer between the base steel sheet and the Zn—Ni alloy plate layer, whereby the plated steel sheet may have good stone chipping resistance. If the coating weight of the Ni plate interlayer is smaller than 0.05 $g/m^2$, the plated steel sheet could not have good stone chipping resistance. However, if it is more than 1 $g/m^2$, the anti-powdering property of the plated steel sheet is poor. Therefore, the coating weight of the Ni plate interlayer is preferably from 0.05 to 1 $g/m^2$. More preferably, it is from 0.1 to 0.5 $g/m^2$ in order to ensure better stone chipping resistance and better powdering resistance.

The chromate layer as formed on the zinc or zinc alloy plated steel sheet for use in the present invention inhibits the corrosion of the steel sheet, owing to the passivating action of the hexavalent chromate ions existing in the chromate layer, owing to the action of the film of trivalent chromium oxide hydrate, a product to be formed through reduction of chromate ions, which covers the surface of the steel sheet to reduce the anodic area thereof, and owing to the action of the trivalent chromium oxide hydrate film acting as the barrier to prevent water and oxygen from diffusing into the steel sheet. The coating weight of the chromate layer is from 5 to 200 $mg/m^2$ in terms of metallic chromium. If it is smaller than 5 $mg/m^2$, the corrosion resistance of the coated steel sheet is poor. However, if it is larger than 200 $mg/m^2$, the weldability of the coated steel sheet is poor. In order to ensure higher corrosion resistance and higher weldability, the coating weight is preferably from 10 to 150 $mg/m^2$.

Any of reacted-in-place chromate treatment, electrolytic chromate treatment and dried-in-place chromate treatment may apply to the formation of the chromate layer on the steel sheet base. In view of the corrosion resistance of the coated steel sheet, dried-in-place chromate treatment is preferred through which many hexavalent chromate ions can be introduced into the chromate layer formed.

The dried-in-place chromate layer can be formed by coating a zinc or zinc alloy plated steel sheet with a solution consisting essentially of an aqueous solution of partially reduced chromic acid and further containing one or more additives selected from (1) to (7) below, if required, followed by directly drying it without rinsing it with water:

(1) An organic resin such as a water-soluble or -dispersible acrylic or polyester resin;

(2) a colloid and/or powder of an oxide such as silica, alumina, titania or zirconia;

(3) an acid such as molybdic, tungstic or vanadic acid, and/or a salt thereof;

(4) a phosphoric acid such as phosphoric or polyphosphoric acid;

(5) a fluoride such as zirconium fluoride, silicofluoride or titanium fluoride;

(6) a metal ion such as a zinc ion; and (7) an electrically conductive fine powder such as iron phosphide or antimony-doped tin oxide.

In the dried-in-place chromate treatment, a roll coater is usually employed for coating the strip with the solution, though it is also possible to apply the solution to the strip by dipping or spraying, and thereafter regulate its coating weight with an air knife, or by roll squeezing.

Over the chromate layer, formed is an organic film, which inhibits any excessive release of hexavalent chromate ions from the chromate layer into a corrosive environment to thereby ensure the long-lasting anti-corrosive effect of the chromate layer, while the lubricant added to the organic film improves the lubricative property of the coated steel sheet during press-forming of the sheet. In addition, the rust preventive additive such as silica or the sparingly soluble chromate as added to the organic film further improve the corrosion resistance of the coated steel sheet.

The organic film comprises an epoxy resin mixture, a lubricant and a rust preventive additive in a specifically-defined ratio of these, in which said epoxy resin mixture is composed of a base resin (A) as prepared by adding at least one basic nitrogen atom and at least two primary hydroxyl groups to the ends of an epoxy resin, and a curing agent for (A) of a polyisocyanate compound (B). as mixed in a specifically-defined ratio of A/B.

The epoxy resin is preferably one consisting essentially of a condensate of bisphenol A and epichlorohydrin. Although there are known various epoxy resins consisting solely of an aliphatic or alicyclic structure, such as an epoxidized oil and epoxy polybutadiene, it is preferable to use in the present invention an epoxy resin consisting essentially of the above-mentioned condensate to achieve excellent corrosion resistance. The preferred epoxy resins which are commercially available include Epicoat 828, 1001, 1004, 1007, 1009 and 1010 (all products of Yuka Shell Epoxy Co., Ltd.). It is desirable that the epoxy resin for use in the present invention has a number-average molecular weight of 1500 or higher, if it requires curing at low temperatures. The above-mentioned commercial products, Epicoats, can be used singly or as combined. In the manner to be mentioned hereinunder, at least one basic nitrogen atom and at least two primary hydroxyl groups are added to the ends of the epoxy resin to give the base resin (A).

To introduce at least one basic nitrogen atom and at least two primary hydroxyl groups into the epoxy resin, for example, employable is a method of adding an alkanolamine and/or an alkylalkanolamine to the glycidyl group of the epoxy resin. These amines include, for example, monoethanolamine, diethanolamine, dimethylaminoethanolamine, monopropanolamine, dipropanolamine and dibutanol amine, which can be used singly or as combined.

The base resin of the type mentioned hereinabove is specifically used in the present invention for the following reasons:

(1) The film is prevented from being broken by alkalis to be formed through cationic electrodeposition, and the adhesion of the underlying chromate layer to the film formed through cationic electrodeposition is stabilized;

(2) The primary hydroxyl groups and the organic solvent composition that is specifically selected in the manner to be mentioned hereinunder improve the reactivity of the epoxy resin with a crosslinking agent at low temperatures; and (3) In addition, the introduction of at least two mols of hydroxyl groups in one molecule of the epoxy resin enables the formation of a film having a satisfactorily high crosslinking density. No satisfactory crosslinking can be expected from the introduction of less than two mols of hydroxyl groups.

If desired, the epoxy resin, thus having at least two mols of primary hydroxyl groups in one molecule, may be partially modified with any other compound. The partial modification of the epoxy resin can be effected by, for example:

(1) Esterification with monocarboxylic acids;

(2) Modification with aliphatic or aromatic amines; or (3) Modification with hydroxy acids.

In addition to the above, known is modification with dicarboxylic acids, which, however, is not suitable to the base resin for use in the present invention, since the molecular weight of the modified resin is difficult to control.

The base moiety of the epoxy resin could be neutralized with low-molecular acids to convert the resin into a water-dispersible or water-soluble resin, which, however, could not form a tough film when baked at low temperatures. The acidic compounds as used for the neutralization to give such a water-dispersible or water-soluble resin will form salts in the baked film, resulting in easy penetration of water into the film in a wet environment to thereby worsen the corrosion resistance and the adhesiveness of the film. In addition, if such an aqueous resin is used in the present invention, hexavalent chromate ions dissolve out from the underlying chromate film into the resin liquid applied thereto, causing the gelation of the resin liquid to lower the working efficiency in forming the resin film. For these reasons, solvent-type epoxy resins to be dissolved in non-aqueous, organic solvents are used in the present invention.

The organic solvent usable herein includes, for example, hydrocarbons, ketones, esters, ethers, low-molecular alcohols having 4 or less carbon atoms, and alcohols a secondary or tertiary hydroxyl group. These can be used herein singly or as combined. However, alcohol solvents having a high boiling point are unfavorable for the present invention, as interfering with the curing of the resin film.

To cure the base resin, preferably utilized is the urethanation between the hydroxyl groups in the base resin and the isocyanato groups in the polyisocyanate compound. In order to stably store the coating composition prior to being formed into a film, the curing agent, polyisocyanate compound must be protected in the composition. To protect the polyisocyanate compound, for example, the isocyanato groups in the compound may be protected with protecting groups that are split from the compound under heat to give free, reactive isocyanato groups.

The polyisocyanate compound (B) for use in the present invention includes, for example, aliphatic, alicyclic, heterocyclic or aromatic isocyanate compounds having at least two isocyanato groups in one molecule; derivatives of these compounds as obtained through partial reaction thereof with polyalcohols; biuret-type adducts of these compounds; and isocyanurate adducts of these compounds. Specific examples of these compounds are:

(1) m- or p-phenylene diisocyanate, 2,4- or 2, 6-tolylene diisocyanate, p-xylylene diisocyanate, hexamethylene diisocyanate, diisocyanates of dimer acids, isophorone diisocyanate;

(2) polyisocyanate compounds having three or more isocyanato groups in one molecule, such as triphenylmethane-4,4',4"-triisocyanate, 1,3,51-triisocyanate-benzene, 2,4,6-triisocyanato-toluene, 4,4'-dimethyldiphenylmethane-2,2',5,5'-tetraisocyanate;

(3) reaction products of one or more of the compounds of the above-mentioned (1) and polyalcohols (dialcohols such as ethylene glycol, propylene glycol; trialcohols such as glycerin, trimethylolpropane; tetraalcohols such as pentaerythritol; hexaalcohols such as sorbitol, dipentaerythritol), having at least two isocyanate groups remained in one molecule; and (4) biuret-type adducts and isocyanurate adducts of hexamethylene diisocyanate, isophorone diisocyanate, tolylene di isocyanate, xylylene diisocyanate, 4,4'-diphenylmethane diisocyanate, 4,4'-methylenebis (cyclohexyl isocyanate), etc.

From the viewpoint of improving the corrosion resistance of the organic composite coated steel sheet of the present invention in a rust-contaminated environment, it is desirable that the polyisocyanate compound to be used for forming the organic film is a polyfunctional polyisocyanate compound having at least three isocyanato groups in one molecule (in this, these isocyanato groups may be blocked).

The polyfunctional polyisocyanate compound of this type having at least three isocyanato groups in one molecule includes, for example, compounds having at least three isocyanato groups in one molecule; compounds as obtained through reaction of an isocyanate compound having at least two isocyanato group in one molecule with a polyalcohol; and biuret-type adducts and isocyanurate adducts of these compounds. Specific examples of these compounds are polyisocyanate compounds having at least three isocyanato groups in one molecule, such as triphenylmethane-4,4',4"-triisocyanate, 1,3,5-triisocyanato-benzene, 2,4,6-triisocyanato-toluene, 4,4'-dimethyldiphenylmethane-2,2',5,5'-tetraisocyanate; adducts as prepared by reacting a polyol, such as ethylene glycol, propylene glycol, 1,4-butylene glycol, polyalkylene glycol, trimethylolpropane, hexanetriol, with a polyisocyanate compound in such a manner that the amount of the isocyanato groups in the polyisocyanate compound is excess over that of the hydroxyl groups in the polyol; biuret-type adducts and isocyanurate adducts of, for example, hexamethylene diisocyanate, isophorone diisocyanate, tolylene diisocyanate, xylylene diisocyanate, 4,4'-diphenylmethane diisocyanate, 4,4'-methylenebis(cyclohexyl isocyanate).

In the adducts as prepared by reacting a polyol with a polyisocyanate compound in such a manner that the amount of the isocyanato groups in the latter is excess over that of the hydroxyl groups in the former, the polyisocyanate compound may be any of polyisocyanate compounds having at least three isocyanato groups in one molecule; aliphatic diisocyanate compounds such as hexamethylene diisocyanate, 1, 4-tetramethylene diisocyanate, diisocyanates of dimer acids, lysine diisocyanate; alicyclic diisocyanate compounds such as isophorone diisocyanate, 4,4'-methylenebis(cyclohexyl isocyanate), methylcyclohexane-2,4- (or 2,6-) diisocyanate, 1, 3- (or 1,4-)di(isocyanatomethyl)cyclohexane; and aromatic diisocyanates, such as xylylene diisocyanate, tolylene diisocyanate, m- (or p-)phenylene diisocyanate, diphenylmethane diisocyanate, bis(4-isocyanatophenyl)sulfone.

Of polyfunctional polyisocyanates having at least six isocyanato groups in one molecule (hexa-functional polyisocyanate compounds), the most effective is polyfunctional hexamethylene diisocyanate for producing organic films having high corrosion resistance in a rust-contaminated environment.

The polyfunctional polyisocyanate for use in the present invention may be a mixture of different compounds belonging to the same group but having different numbers of isocyanato groups per molecule. A combination of two or more of polyfunctional polyisocyanate compounds such as those mentioned hereinabove can also be used in the present invention.

The protecting agent (blocking agent) for isocyanato groups, which can be used in the present invention, includes, for example:

(1) aliphatic monoalcohols, such as methanol, ethanol, propanol, butanol, octyl alcohol;

(2) monoethers, such as monomethyl, monoethyl, monopropyl (n- or iso-), monobutyl (n-, iso- or sec-) ethers, of ethylene glycol and/or diethylene glycol;

(3) aromatic alcohols, such as phenol, cresol; and (4) oximes, such as acetoxime, methyl ethyl ketone oxime.

The reaction of one or more of these agents with isocyanate compounds such as those mentioned hereinabove may give protected isocyanate compounds which are stable at least at room temperature.

Where the present invention is applied to BH steel sheets, in general, the sheets shall be baked at low temperatures (up to 170° C. or lower as the highest temperature of the finally-baked sheets). In this case, therefore, oximes are preferably used as the blocking agent as having a low dissociating point.

The polyisocyanate compound (B), which is a curing agent, is added to the base resin (A) in a ratio by weight, in terms of the nonvolatile content, A/B, of being from 95/5 to 55/45, preferably from 90/10 to 65/35. If the amount of the polyisocyanate compound (B) added is over the ratio, A/B, of 55/45, the non-reacted polyisocyanate compounds remaining in the organic film absorb water, thereby making the organic film have no corrosion resistance in a rust-contaminated environment and rather worsening the perforation corrosion resistance and the adhesion of the organic film. In addition, when the steel sheets as coated with the organic film still containing such non-reacted polyisocyanate compounds are subjected to electrodeposition coating or spray coating to give top-coated steel sheets for use in producing automobile bodies, the non-reacted polyisocyanate compounds diffuse into the top coat, thereby interfering with the curing of the top coat and worsening the adhesion of the top coat to the organic film. In view of these, the amount of the polyisocyanate compound (B) to be added shall not be over the ratio, A/B, of 55/45. On the other hand, if the amount of the polyisocyanate compound (B) added to the base resin (A) does not reach the ratio, A/B, of 95/5, the degree of crosslinking of the resin is low, resulting in poor corrosion resistance and poor adhesion of the organic film formed. If so, in addition, the addition of the polyfunctional polyisocyanate compound could not produce satisfactory improvement in the corrosion resistance of the organic film in a rust-contaminated environment. In order to make the organic film have high corrosion resistance with high adhesion, the amount of the polyisocyanate compound (B) to be added is preferably not lower than that to give the ratio, A/B, of 90/10.

A crosslinking agent, alkyl-etherified amino resin to be prepared by reacting a part or whole of a methylol compound, which may be prepared through the reaction of at least one selected from melamine, urea and benzoguanamine with formaldehyde, with a monoalcohol having from 1 to 5 carbon atoms, can be used along with the polyisocyanate compound.

Although the resin can be satisfactorily crosslinked with the crosslinking agent such as that mentioned above, it is still desirable to add a known curing promoter to the resin in order to enhance the crosslinkability of the resin at low temperatures. The curing promoter includes, for example, N-ethylmorpholine, dibutyl tin dilaurate, cobalt naphthenate, stannous chloride, zinc naphthenate, bismuth nitrate. In addition, in order to improve some other properties of the organic film, such as the adhesion thereof, any of known resins, such as acrylic resins, alkyd resins, polyester resins, may be added to the resin composition.

The amount of the epoxy resin mixture to be in the organic film shall be from 30 to 80% by weight, in terms of the ratio by weight of the nonvolatile contents. If it is less than 30% by weight, the press formability, the perforation corrosion resistance, the paint adhesion and the corrosion resistance in a rust-contaminated environment of the organic composite coated steel sheet are poor. On the other hand, however, if it is more than 80% by weight, the lubricant and the rust preventive additive added could not sufficiently exhibit their effects, resulting in that the press formability, the perforation corrosion resistance and the corrosion resistance in a rust-contaminated environment of the organic composite coated steel sheet formed are poor. In order make the organic composite coated steel sheet have better press formability, higher perforation corrosion resistance, higher paint adhesion and higher corrosion resistance in a rust-contaminated environment, it is preferable that the amount of the epoxy resin mixture falls between 40 and 70% by weight.

The lubricant added to the organic film improve the lubricative property of the zinc or zinc alloy plated steel sheet, thereby inhibiting the adhesion of the sheet to a press mold and improving the press formability of the sheet. The amount of the lubricant to be in the organic film shall be from 3 to 50% by weight. If it is less than 3% by weight, the coated steel sheet could not have satisfactory press formability. On the other hand, however, if it is more than 50% by weight, the adhesion of the coated steel sheet to a top coat to be formed thereon through cationic electrodeposition is lowered. In order to make the organic composite coated steel sheet have better press formability and higher paint adhesion, it is preferable that the amount of the lubricant falls between 5 and 40% by weight.

The lubricant is a composite lubricant composed of a polyolefin wax as prepared by coordination-anionic polymerization using a Ziegler catalyst (e. g., at least one selected from polyethylene wax, polypropylene wax, etc.), and fine powder of a fluorine resin (e. g., fine powder of at least one selected from tetrafluoroethylene resins, tetrafluoroethylene-hexafluoropropylene copolymer resins, tetrafluoroethylene-perfluoroalkyl vinyl ether copolymer resins, tetrafluoroethylene-ethylene copolymer resins, trifluorochloroethylene resins, fluorovinylidene resins, etc.) as combined in a predetermined ratio.

As has been mentioned hereinabove, polyolefin waxes are effective to exhibit good lubricity in oil-free press forming. However, in press forming for producing automobile bodies that is generally conducted in the presence of ordinary rust preventive oil or wash oil, the single use of an ordinary polyolefin wax could not produce good lubricity as in oil-free press forming, resulting in the failure in attaining good press forming. Contrary to this, we, the present inventors have found that when the composite lubricant comprising a particular polyolefin wax and fine powder of a fluorine resin is added to the organic film, the coated steel sheet can have excellent lubricative characteristics even in press forming with oil. The composite lubricant is especially preferably composed of a particular polyethylene wax and fine powder of a particular tetrafluoroethylene resin, as exhibiting the most excellent lubricative property.

The polyolefin wax that constitutes the composite lubricant along with fine powder of a fluorine resin is one as prepared by coordination-anionic polymerization using a Ziegler catalyst.

Ordinary methods for producing polyolefin waxes are as follows:

(a) A method of coordination-anionic polymerization using a Ziegler catalyst.

(b) A method of radical polymerization using a radical catalyst.

(c) A method of pyrolyzing an ordinary shaping polyolefin.

Figure 2:
FIG. 2 graphically shows a molecular structure model of a polyolefin wax as prepared through coordination-anionic polymerization using a Ziegler catalyst.

Of these, polyolefin waxes as prepared by the method (b) and (c) have a branched structure with long-chain branches, as in FIG. 1. On the other hand, polyolefin waxes as prepared by the method (a) have a linear structure with no long-chain branch, as in FIG. 2. Therefore, the latter, when in the organic film, hardly undergo steric hindrance, as not having any long-chain branch. As compared with those prepared by the methods (b) and (c), therefore, the polyolefin waxes prepared by the method (a) can be easily densified on the outermost surface of the organic film, thereby increasing the area at which the polyolefin wax is directly contacted with a tool. For these reasons, it is presumed that the polyethylene waxes prepared by the method (a) can impart better lubricity to the organic film than those prepared by the methods (b) and (c).

The mechanism of the composite lubricant composed of such a particular polyolefin wax and fine powder of a fluorine resin that exhibits such excellent lubrication even in press forming of coated steel sheets with oil is not completely clarified, but may be considered as follows: A polyolefin wax is melted and softened, when slid against an object, to exhibit a semi-melting lubricative mechanism, and, in particular, the polyolefin wax as prepared by coordination-anionic polymerization using a Ziegler catalyst additionally exhibits the particular lubricative mechanism such as that mentioned hereinabove; while, on the other hand, the fine powder of a fluorine resin has a self-lubricative property owing to the small polarization of the C—F bonds therein to produce the weak intermolecular interaction of the resin, and additionally exhibits a cleaving lubricative mechanism owing to the cleavage of the resin itself. The combination of these two components each exhibiting different lubricative mechanisms produces a synergistic lubricative effect, whereby the composite lubricative can exhibit excellent lubrication even in press forming of the coated steel sheet with oil.

The ratio by weight of the polyolefin wax (c) to the fine powder of a fluorine resin (D), C/D, shall be from 10/90 to 90/10. If overstepping the range of C/D that shall fall between 10/90 and 90/10, the intended synergistic effect of the composite lubricant could not be attained, resulting in that the lubricative property of the coated steel sheet is poor. Preferably, the ratio, C/D, is between 30/70 and 70/30, as making the coated steel sheet have much better lubricity.

As the fine-powdery fluorine resin to be in the lubricant, a fine-powdery tetrafluoroethylene resin is preferred, as exhibiting the highest lubricative property. Of this, more preferred is one that has a smaller molecular weight as exhibiting much better lubricative characteristics. It is difficult to directly measure the molecular weight of the fine-powdery tetrafluoroethylene resin. Therefore, the dependence of the apparent melt viscosity of the resin, as measured according to the method of testing the flow properties of resins with a capillary rheometer, on the apparent rate of shear of the resin is determined in accordance with JIS K7199, which may indicate the molecular weight of the resin. The apparent melt viscosity of a resin having a predetermined, apparent rate of shear is to be larger, when the resin has a larger molecular weight, while, on the contrary, a resin having a smaller molecular weight is to have a smaller apparent melt viscosity with having the same predetermined apparent rate of shear.

A fine-powdery tetrafluoroethylene resin, of which the apparent melt viscosity and the apparent rate of shear as measured according to the method of testing the flow properties of the resin with a capillary rheometer in accordance with JIS K7199 and under the conditions mentioned below satisfy the following equation (1), is preferred, as exhibiting especially excellent lubricative characteristics.

$$\log \eta \leqq A - B \log \gamma \quad (1)$$

in which;

A is 5.45;

B is 0.65;

$\eta$ is the apparent melt viscosity (poise) of the resin, provided that $\eta > 0$; and $\gamma$ is the apparent rate of shear of the resin ($sec^{-1}$), provided that $5 \leqq \gamma \leqq 1300$.

Test Conditions:

Temperature: 330° C.

Diameter of Barrel: 9.55 mm

Dimension of Capillary:

Diameter, d=1 mm

Length, 1=10 mm

Inlet of Capillary: flat

Of the fine-powdery tetrafluoroethylene resin, especially preferred is one having a mean particle size of from 0.1 to 5 μm. If its mean particle size is smaller than at 0.1 μm, the particles of the fine-powdery tetrafluoroethylene resin are completely embedded in the organic film, resulting in that the lubricant comprising the powder exhibits insufficiently its lubricative property. On the other hand, however, if it is larger than 5 μm, the organic film can hardly carry the particles of the resin therein, resulting in that the particles easily drop out of the film during press forming of the coated steel sheet, thereby lowering the lubricative property of the steel sheet.

Of the fine-powdery tetrafluoroethylene resin having a mean particle size falling within the defined range, preferred is one having a specific surface area of 11 $m^2/g$ or smaller as measured according to the BET method, as having excellent dispersion stability in the coating composition to be formed into the organic film.

Figure 3:
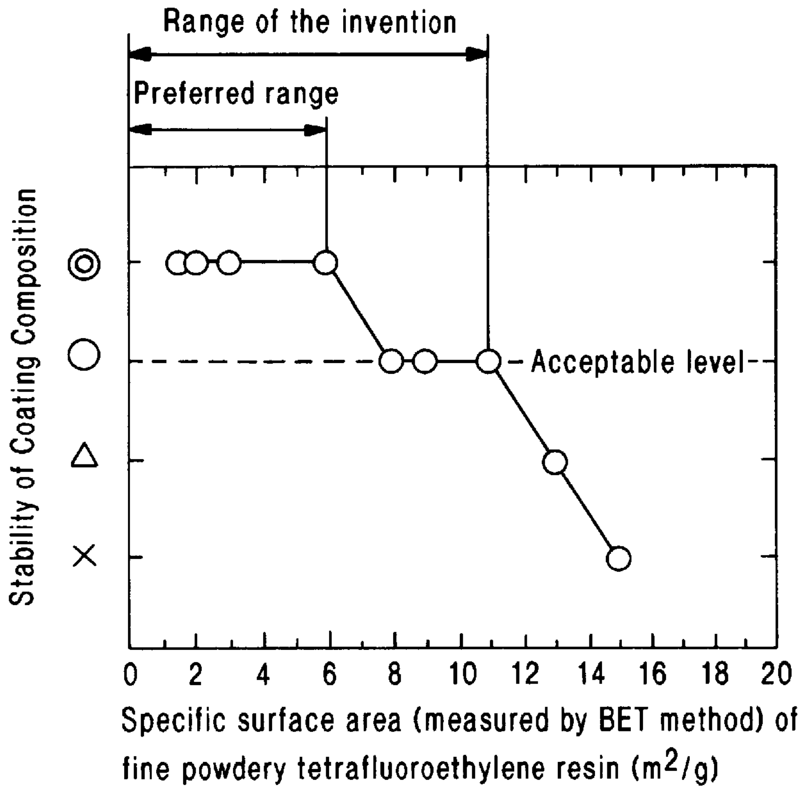
FIG. 3 is a graph showing the relationship between the specific surface area of fine powder of a tetrafluoroethylene resin as added to a coating composition and the dispersion stability of the resin in the composition.

Various coating compositions were prepared by mixing an epoxy resin mixture (No. 2 in Table 5), a rust preventive additive (silica+sparingly soluble chromate), a polyolefin wax (No. 3 in Table 6) and a fine-powdery tetrafluoroethylene resin having a mean particle size of about 3 μm and having a varying specific surface area, in a sand mill, and the stability of the coating compositions was checked. FIG. 3 is a graph showing the relationship between the specific surface area of the fine-powdery tetrafluoroethylene resin in the coating composition prepared and the dispersion stability of the resin in the composition. As in FIG. 3, it is known that the stability of the coating compositions is significantly lowered when the specific surface area of the resin powder in the compositions is larger than 11 $m^2/g$. Being different from these, the coating compositions comprising the fine-powdery tetrafluoroethylene resin having a specific surface area of 11 $m^2/g$ or smaller are stable, and those comprising the resin powder having a specific surface area of 6 $m^2/g$ or smaller are much more stable. For these reasons, it is desirable that the fine-powdery tetrafluoroethylene resin to be employed herein has a specific surface area of 11 $m^2/g$ or smaller, preferably 6 $m^2/g$ or smaller.

Referring to the data in FIG. 3, the dispersion stability of the coating compositions was determined by keeping the compositions (having a nonvolatile content of 20% by weight) at 40° C. for one month followed by observing the precipitation, if any, of the lubricant in the compositions. The criteria for the determination of the dispersion stability are as follows:

◎: No precipitate formed, and the composition did not changed.

○: Precipitates formed, but the composition was restored to its original condition after stirred lightly.

Δ: Precipitates formed, but the composition was restored to its original condition after stirred strongly.

×: Precipitates formed, and the composition was not restored to its original condition even after stirred strongly.

Combinations of two or more fine-powdery tetrafluoroethylene resins that satisfy the above-mentioned equation (1) and have a specific surface area falling within the above-defined range also produce excellent lubrication.

The polyolefin wax that constitutes the lubricant for use in the present invention is one as prepared by coordination-anionic polymerization using a Ziegler catalyst, such as that mentioned hereinabove. Of the polyolefin wax of this type, especially preferred is a polyethylene wax, as producing good lubrication.

Of the polyethylene wax, more preferred is one having a molecular weight of from 700 to 4500 and having a softening point of from 100 to 140° C. as producing better lubrication. Most preferred is a polyethylene wax having a molecular weight of from 1000 to 3500 and having a softening point of from 110 to 130° C., as producing lubrication of the highest degree.

Figure 4:
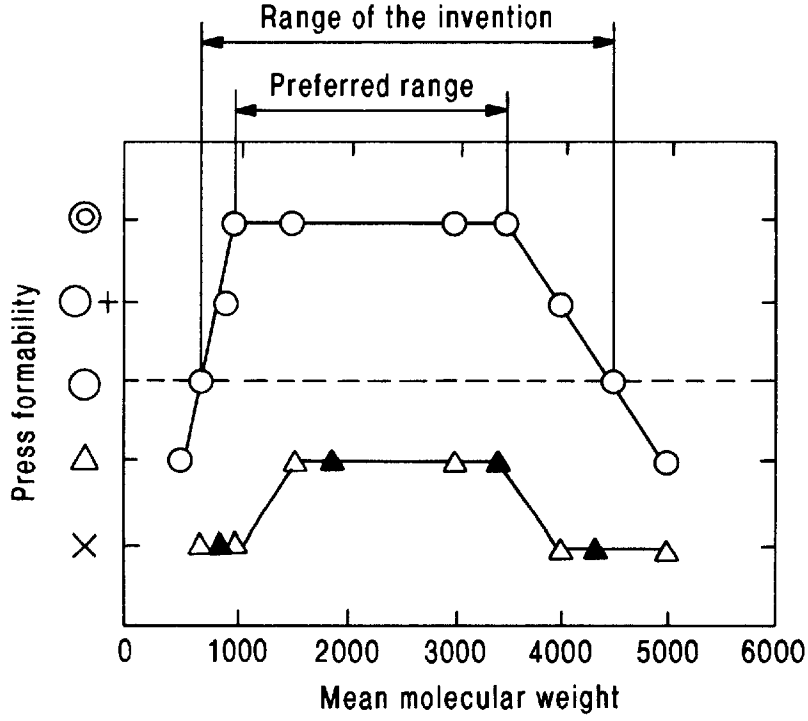
FIG. 4 is a graph showing the relationship between the mean molecular weight of a polyethylene wax as added to an organic film and the press formability of the organic composite coated steel sheet having the organic film.

Various organic composite coated steel sheet samples were prepared, each comprising a zinc alloy-plated steel sheet base (No. 4 in Table 4) having on its surface a first chromate layer and a second layer of an organic film comprising an epoxy resin mixture (No. 2 in Table 5), a rust preventive additive (silica+sparingly soluble chromate), a fine-powdery tetrafluoroethylene powder (No. 17 in Table 7), and any of polyethylene waxes (softening point: 110 to 130° C.) as prepared by different methods to have a different molecular weight. FIG. 4 is a graph showing the relationship between the molecular weight of the polyethylene wax as added to the organic film of each sample and the press formability of the coated steel sheet samples. To determine the press formability of these samples, employed was the Condition 2 as referred to in the examples to be mentioned hereinunder. The Condition 2 is severer than the Condition 1 also referred to in the following examples. As in FIG. 4, it is known that the press formability of the samples comprising the polyethylene wax that had been prepared by coordination-anionic polymerization using a Ziegler catalyst and had a molecular weight of from 700 to 4500 is good, and that polyethylene waxes having a molecular weight of from 1000 to 3500 are especially preferred as producing better press formability of the samples.

The polyethylene waxes as referred to in FIG. 4 are as follows:

○: Polyethylene wax as prepared by coordination-anionic polymerization using a Ziegler catalyst.

Δ: Polyethylene wax as prepared by radical polymerization using a radical catalyst.

▲: Polyethylene wax as prepared by pyrolysis of ordinary shaping polyethylene.

Referring to the data in FIG. 4, the samples were subjected to a cylindrical deep drawing test under the pressing conditions mentioned below, to determine their press formability. In the test, the deep drawing height of each sample at which the sample cracked was measured, and this was compared with the data of the deep drawing height of various cold-rolled steel sheets (thickness: 0.8 mm) of different material levels. The criteria for the determination of the press formability are mentioned below.

Press Conditions:

Diameter of Punch: 50 mm

Radius of Punch Shoulder: 5 mm

Diameter of Die: 53 mm

Radius of Die Shoulder: 3 mm

Diameter of Blank: 110 mm

BHF: 5.0 tons

Amount of Rust Preventive Oil Coated: 1.0 $g/m^2$

Criteria for Determination of Press Shapability:

◎: Better than EDDQ cold rolled steel sheet (No. 8 in Table 1).

○+: Same as EDDQ cold rolled steel sheet (No. 8 in Table 1).

○: Same as DDQ cold rolled steel sheet (No. 6 in Table 1).

Δ: Same as DQ cold rolled steel sheet (No. 4 in Table 1).

×: Same as or worse than CQ cold rolled steel sheet (No. 1 in Table 1).

Figure 5:
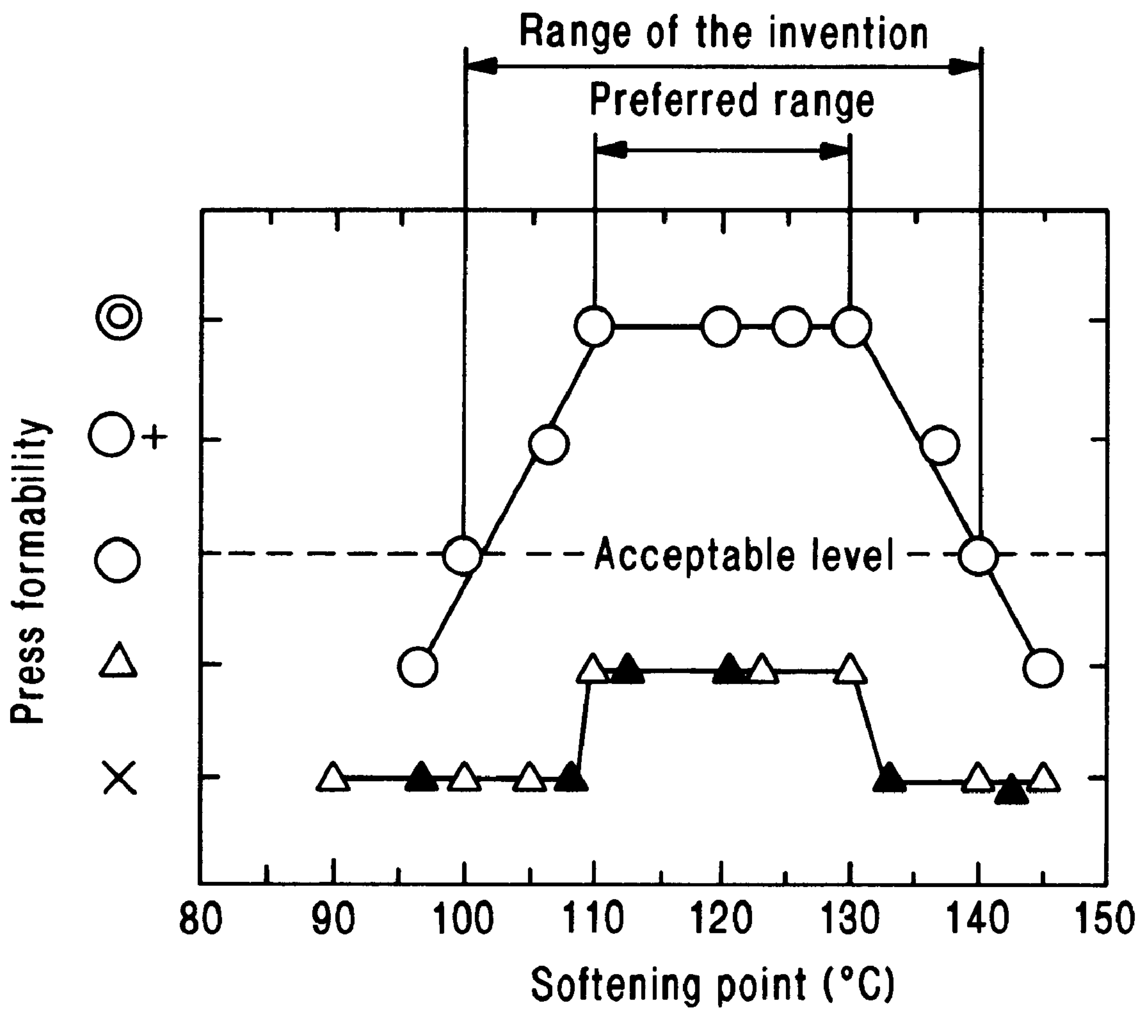
FIG. 5 is a graph showing the relationship between the softening point of a polyethylene wax as added to an organic film and the press formability of the organic composite coated steel sheet having the organic film.

Various organic composite coated steel sheet samples were prepared, each comprising a zinc alloy-plated steel sheet base (No. 4 in Table 4) having on its surface a first chromate layer and a second layer of an organic film comprising an epoxy resin mixture (No. 2 in Table 5), a rust preventive additive (silica+sparingly soluble chromate), a fine-powdery tetrafluoroethylene powder (No. 17 in Table 7), and any of polyethylene waxes (molecular weight: 1000 to 3500) as prepared by different methods to have a different softening point. FIG. 5 is a graph showing the relationship between the softening point of the polyethylene wax as added to the organic film of each sample and the press formability of the coated steel sheet samples. To determine the press formability of these samples, employed was the Condition 2 as referred to in the examples to be mentioned hereinunder. The Condition 2 is severer than the Condition 1 also referred to in the following examples.

As in FIG. 5, it is known that the press formability of the samples comprising the polyethylene wax that had been prepared by coordination-anionic polymerization using a Ziegler catalyst and had a softening point of from 100 to 140° C. is good. However, when any of polyethylene waxes having a softening point of lower than 100° C. was used, it was completely liquefied to be fluid, while the samples being formed were slid against the forming tools, and became mixed with the oil as applied to the sheet sample being formed, resulting in that the polyethylene wax could not exhibit its intrinsic lubricative property. As a result, the press formability of the samples comprising any of such polyethylene waxes having a softening point of lower than 100° C. was not improved. On the other hand, however, polyethylene waxes having a softening point of higher than 140° C. could not be softened while the samples being formed were slid against the forming tools, resulting in that they failed in exhibiting their intrinsic, semi-melting lubricative property. As a result, the press formability of the samples comprising any of such polyethylene waxes having a softening point of higher than 140° C. was not also improved. As in FIG. 5, it is known that polyethylene waxes having a softening point of from 110 to 130° C. are more preferred, as producing better press formability of the samples.

The polyethylene waxes as referred to in FIG. 5 are as follows:

○: Polyethylene wax as prepared by coordination-anionic polymerization using a Ziegler catalyst.

Δ: Polyethylene wax as prepared by radical polymerization using a radical catalyst.

▲: Polyethylene wax as prepared by pyrolysis of ordinary shaping polyethylene.

Referring to the data in FIG. 5, the samples were subjected to a cylindrical deep drawing test under the pressing conditions mentioned below, to determine their press formability. In the test, the deep drawing height of each sample at which the sample cracked was measured, and this was compared with the data of the deep drawing height of various cold-rolled steel sheets (thickness: 0.8 mm) of different material levels. The criteria for the determination of the press formability are mentioned below.

Press Conditions:

Diameter of Punch: 50 mm

Radius of Punch Shoulder: 5 mm

Diameter of Die: 53 mm

Radius of Die Shoulder: 3 mm

Diameter of Blank: 110 mm

BHF: 5.0 tons

Amount of Rust Preventive Oil Coated: 1.0 g/m$^2$

Criteria for Determination of Press Formability:

◎: Better than EDDQ cold rolled steel sheet (No. 8 in Table 1).

○+: Same as EDDQ cold rolled steel sheet (No. 8 in Table 1).

○: Better than DDQ cold rolled steel sheet (No. 6 in Table 1).

Δ: Same as DQ cold rolled steel sheet (No. 4 in Table 1).

×: Same as or worse than CQ cold rolled steel sheet (No. 1 in Table 1).

Other polyethylene waxes as prepared by (1) introducing polar groups, such as carboxyl group, hydroxyl group and carbonyl group, into the polyethylene wax prepared by coordination-anionic polymerization using a Ziegler catalyst, through oxidation of the latter; (2) modifying said polyethylene wax with acids, esters or aromatic compounds; or (3) copolymerizing with a-olefins in the coordination-anionic polymerization using a Ziegler catalyst, were found to be usable in the present invention with no problem on the lubricity of the coated steel sheet, provided that they have a softening point and a molecular weight that fall within the above-defined ranges. Comprising any of such other polyethylene waxes, the organic composite coated steel sheet of the invention may have excellent press formability. Combinations of two or more polyethylene waxes having a softening point and a molecular weight that fall within the above-defined ranges are also employable in the present invention, as producing excellent lubricity.

As has been mentioned hereinabove, the excellent lubricity of the organic composite coated steel sheet of the present invention in press shaping with oil results from the synergistic effect to be attained by the combination of two lubricants, a polyolefin wax (preferably, polyethylene wax) as prepared by coordination-anionic polymerization using a Ziegler catalyst and a fine-powdery fluorine resin (preferably, fine-powdery tetrafluoroethylene resin), each acting to exhibit a different lubricative mechanism. Therefore, the composite lubricant to be used in the invention may be in the form of particles of a mixture composed of a polyolefin component (polyolefin as prepared by coordination-anionic polymerization using a Ziegler catalyst) and a fluorine resin component in one particle, which particles are produced through so-called melt-blending of the constitutive components, and the particulate composite lubricant of that type may produce lubrication that is comparable to or is near to that to be produced by the composite lubricant comprising a polyolefin wax and a fine-powdery fluorine resin independently not in fused particles. The same shall apply also to a composite lubricant of a still different type, or that is, the combination comprising the particulate composite lubricant of the above-mentioned type, and a polyolefin wax and/or a fine-powdery fluorine resin.

In the embodiment of using the particulate lubricant (E) comprising both a polyolefin (C') as prepared through coordination-anionic polymerization using a Ziegler catalyst and a fluorine resin (D') in one particle, or in the embodiment of using a composite lubricant comprising said particulate lubricant (E), and a polyolefin wax (C) and/or fine powder of a fluorine resin (D), the ratio by weight of said polyolefin wax (C) and said polyolefin (C') to said fine-powdery fluorine resin (D) and said fluorine resin (D'), (C+C')/(D+D'), is from 10/90 to 90/10. This is because, for the same reasons as those for the weight ratio of C/D mentioned hereinabove, the weight ratio, (C+C')/(D+D'), that oversteps the defined range of from 10/90 to 90/10 cannot produce any satisfactory synergistic effect of the combination of these components, resulting in the failure in attaining the intended lubrication. In order to attain more excellent lubrication, the weight ratio, (C+C')/(D+D'), is preferably defined to fall between 30/70 and 70/30.

For the particulate lubricant (E) comprising both the polyolefin and the fluorine resin in one particle, the preferred conditions for the constitutive components, polyolefin and fluorine resin, are the same as those mentioned hereinabove for the polyolefin wax and the fine-powdery fluorine resin. Namely, it is desirable that the fluorine resin that constitutes the particulate lubricant (E) has an apparent melt viscosity that depends on the apparent rate of shear thereof, while satisfying the above-mentioned equation (1); and it is desirable that the polyolefin that constitutes the particulate lubricant (E) has a molecular weight of from 700 to 4500 and a softening point of from 100 to 140° C., and preferably has a molecular weight of from 1000 to 3500 and a softening point of from 110 to 130° C.

The amount of the rust preventive additive to be added to the organic film shall be from 3 to 50% by weight. If it is less than 3% by weight, the improvement in the perforation corrosion resistance of the organic composite coated steel sheet of the invention and the corrosion resistance thereof in a rust-contaminated environment is unsatisfactory. On the other hand, if the amount is more than 50% by weight, the organic film is peeled from the base sheet during press forming, resulting in that the press formability of the organic composite coated steel sheet of the invention is worsened. In order to make the coated steel sheet of the invention have higher perforation corrosion resistance and better press formability, the amount of the rust preventive additive to be added is preferably from 5 to 40% by weight.

The rust preventive additive for use in the present invention includes, for example, fine powders and colloids of silica, sparingly soluble chromates, aluminium dihydrogen tripolyphosphate, aluminium phosphomolybdate, zinc phosphate, etc. Of these, most preferred are silica and sparingly soluble chromates from the viewpoint of their corrosion-preventing property. For silica, it is presumed that a minor amount of silica may dissolve out on the organic film in a corrosive environment to release silicate ions thereon, which act as a film-forming corrosion inhibitor thereby preventing the zinc or zinc alloy plated steel sheet base from being corroded. For sparingly soluble chromates, it is believed that a minor amount of the sparingly soluble chromate may dissolve out on the organic film in a corrosive environment to release hexavalent chromate ions thereon, thereby preventing the zinc or zinc alloy plated steel sheet base from being corroded according to the same mechanism as that for the underlying chromate layer.

The combination of silica and a sparingly soluble chromate is preferred, as producing much higher corrosion resistance. For example, when silica and a sparingly soluble chromate are added to the organic film in a ratio by weight, silica/sparingly soluble chromate, of from 90/10 to 10/90, the combination of these two produces highest corrosion resistance due to the synergistic corrosion-inhibiting effect of the two. However, if the ratio by weight, silica/sparingly soluble chromate, oversteps the defined range that falls between 90/10 and 10/90, the synergistic effect of the two is lowered, resulting in that the corrosion resistance to be attained by the addition of the two is somewhat lowered.

Specific examples of silica usable in the present invention include fumed silica (e. g., products of Nippon Aerosil Co., Ltd., known as AEROSIL 130, AEROSIL 200, AEROSIL 300, AEROSIL 380, AEROSIL R972, AEROSIL R811, AEROSIL R805), organosilica sol (e.g., products of Nissan Chemical Industries, Ltd., known as MA-CT, IPA-ST, NBA-ST, IBA-ST, PG-ST, XBA-ST, ETC-ST, DMAC-ST), silica of the precipitated type obtained by the reaction of sodium silicate and mineral acids (e.g., products of Tokuyama Soda Co., Ltd., known as T-32(S), K-41, F-80), and silica of the gel type obtained by the reaction of sodium silicate and mineral acids (e.g., products of Fuji Davison Chemical, Ltd., known as SYLOID 244, SYLOID 150, SYLOID 72, SYLOID 65, SHIELDEX). If desired, usable herein is a mixture of two or more types of silica such as that mentioned above.

If hydrophobic silica as prepared by substituting the silanol groups (≡Si—OH) existing on its surface with methyl groups or the like to make its surface hydrophobic is added to the epoxy resin to form the organic film, the affinity of the resulting organic film for an aqueous paint to be formed thereon by cationic electrodeposition is poor, resulting in the failure in the formation of a smooth paint film on the coated steel sheet of the invention, which thereby lowers the clearness of the final coated steel sheet having thereon an intermediate coat and a top coat in that order. Therefore, in order to attain high clearness of the final coated steel sheet, preferably used herein is hydrophilic silica of which the surface is not hydrophobicated. To further improve its corrosion-inhibiting activity, silica for use in the present invention may be ion-exchanged with any corrosion-inhibiting cation of, for example, calcium, zinc, cobalt, lead, strontium, lithium, barium, manganese or the like. It is believed that these cations are ion-exchanged with protons in a corrosive environment to be released from the cation-exchanged silica, thereby forming stable corrosion products on the surface of metal to inhibit the corrosion of metal.

On the other hand, regarding the corrosion resistance of the coated steel sheet in a rust-contaminated environment, hydrophobic silica is more effective for improving the corrosion resistance in a rust-contaminated environment than hydrophilic silica. It is presumed that hydrophilic silica, as being strongly hydrophilic, easily induces the penetration of iron ions and iron oxides existing in iron rust into the coated steel sheet and therefore will be not so effective for improving the corrosion resistance of the coated steel sheet in a rust-contaminated environment.

Preferably used herein is silica having a specific surface area of from 20 to 1000 $m^2/g$ as measured by the BET method. If silica having a specific surface area of smaller than 20 $m^2/g$ is used, its effect for improving the corrosion resistance of the coated steel sheet is poor and, in addition, the smoothness of the surface of the coated steel sheet, after having been painted by electrodeposition, is poor, resulting in poor clearness of the final coated steel sheet. On the other hand, if silica having a specific surface area of larger than 1000 $m^2/g$ is used, the coating composition comprising such silica is to be too much thixotropic, resulting in that the coatability of the composition with roll coaters or the like is worsened.

The sparingly soluble chromate for use in the present invention may be fine powder of, for example, barium chromate ($BaCrO_4$), strontium chromate ($SrCrO_4$), calcium chromate ($CaCrO_4$), zinc chromate ($ZnCrO_4Zn(OH)_2$), potassium zinc chromate ($K_2O.4ZnO.4CrO_3.3H_2O$), lead chromate ($PbCrO_4$) of the like. Two or more of such sparingly soluble chromates may be used herein, as combined. From the viewpoint of their corrosion-inhibiting effect, preferred are barium chromate and strontium chromate of which the long-lasting self-healing effect is expected owing to the hexavalent chromate ions.

In particular, in order to minimize the release of water-soluble chromium from the sparingly soluble chromate as added to the organic film during the step of pre-painting treatment of the coated steel sheet to be formed into automobile bodies, preferred is barium chromate having a low degree of water-solubility.

Preferably, the sparingly soluble chromate has a mean particle size of from 0.1 to 1.0 μm. This is because of the following reasons. If having a mean particle size of smaller than 0.1 μm, the water-solubility of the sparingly soluble chromate is too high with the result that the self-healing effect thereof owing to hexavalent chromate ions could not last long. On the other hand, however, if the chromate having a mean particle size of larger than 1.0 μm is used, the smoothness of the surface of the coated steel sheet, after having been painted by electrodeposition, is poor, often resulting in poor clearness of the final coated steel sheet.

The coating composition for use in the present invention consists essentially of the epoxy resin mixture, the lubricant, and the rust preventive additive (silica and sparingly soluble chromate), such as those mentioned hereinabove. If desired, any other additives may be added to the composition without overstepping the scope of the present invention. For example, the coating composition may contain, in addition to the indispensable components, any one or more additives of electroconductive substances (e.g., iron phosphide, graphite, antimony-doped tin oxide, antimony-doped tin oxide-coated titanium oxide, antimony-doped indium oxide, carbon black, titanium black, metal powder), silane coupling agents, color pigments (e.g., condensed polycyclic organic pigments, phthalocyanine organic pigments), color dyes (e. g., azo dyes, azo metal complex dyes), surfactants, hydrophilic polyamide resins (e. g., nylon 6, nylon 66, copolymers of nylon 6 or nylon 66 with other nylons, such as polyether polyol-modified nylons, polyester polyol-modified nylons, polybutadiene polyol-modified nylons, polypropylene glycol-modified nylons), and other lubricants.

Figure 6:
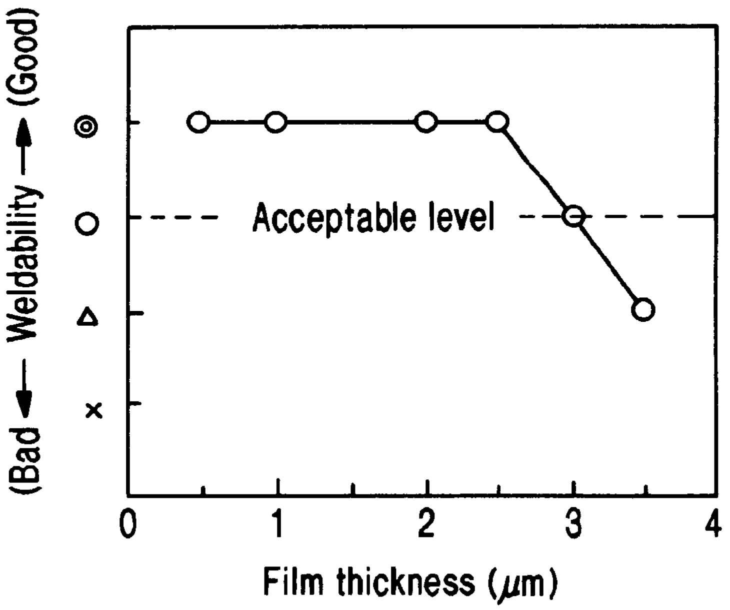
FIG. 6 is a graph showing the relationship between the thickness of an organic film and the weldability of a steel sheet coated with the film.

The organic film is formed on the chromate layer at a film thickness of from 0.1 to 3.0 μm, preferably from 0.2 to 2.5 μm. If its thickness is smaller than 0.1 μm, the organic film cannot produce satisfactory perforation corrosion resistance, corrosion resistance in a rust-contaminated environment and lubricity. On the other hand, if it is larger than 3.0 μm, the weldability (especially, continuous spot weldability) and the clearness of the coated steel sheet is poor. FIG. 6 shows the relationship between the thickness of an organic film and the spot weldability (continuous spot weldability) of a steel sheet coated with the film. From this, it is known that the spot weldability of the steel-sheet coated with the organic film having a thickness of larger than 3.0 μm is poor.

To obtain the data shown in FIG. 6, coated steel sheet samples were tested for their continuous spot weldability under the following conditions.

Electrode: CF Model

Pressure: 200 kgf

Electrification: 10 cycles/50 Hz

Current: 10 KA

To form the organic film on a steel sheet, in general, the coating composition is applied onto the steel sheet using a roll coater. Apart from this, it is also possible to apply the coating composition onto a steel sheet by dipping or spraying, after which the amount of the composition coated may be controlled with an air knife or by roll squeezing. The steel sheet thus coated with the coating composition may be heated, for example, in a hot-air, high-frequency induction or infrared heating oven. Preferably, it is heated at a temperature of from 80° C. to 250 ° C., preferably from 100° C. to 200° C.

If the heating temperature is lower than 80° C., the film cannot be satisfactorily crosslinked and therefore cannot have satisfactory corrosion-inhibiting ability. On the other hand, however, if the coated steel sheet is baked at high temperatures higher than 250° C., its corrosion resistance is lowered. This is presumed because of the following reasons. The high-temperature baking may cause the vaporization of water from the components constituting the underlying chromate film and also the rapid dehydrating condensation of the hydroxyl groups (═Cr—OH) in the film, whereby the chromate film will be cracked and broken. In addition, it may further promote the reduction of hexavalent chromium in the film to thereby lower the passivating action of hexavalent chromium therein. Where the present invention is applied to a BH-type, zinc or zinc alloy plated steel sheet, the heat treatment is preferably conducted at 170° C. or lower.

Automobile bodies are painted by cationic electrodeposition. If the wet electrical resistance of composite film (chromate film+organic film) is higher than 2000 $K\Omega/cm^2$, there occurs a problem in that the coated steel sheet could not be painted well by cationic electrodeposition. For this reason, for the coated steel sheet of the invention, if desired to be formed into automobile bodies or the like, it is preferable that the composite film (chromate film+organic film) is formed on a steel sheet in such a manner that the wet electrical resistance of the composite film formed may be not higher than 2000 $K\Omega/cm^2$.

The present invention includes organic composite coated steel sheets having, either on one surface or on the both surfaces, the film structure as mentioned hereinabove. Accordingly, the present invention includes, for example, the following embodiments.

(1) One surface coated with a plate film—a chromate film—an organic film, with the other surface of Fe.

(2) One surface coated with a plate film—a chromate film—an organic film, with the other surface coated with a plate film.

(3) One surface coated with a plate film—a chromate film—an organic film, with the other surface coated with a plate film—a chromate film.

(4) Both surfaces coated with a plate film—a chromate film—an organic film.

The organic composite coated steel sheet of the present invention can be applied to not only automobiles but also electric appliances and buildings.

Over the organic film may be provided a third layer of rust preventive oil. For this layer, employable are any ordinary rust preventive oil, rust preventive wash oil and rust preventive lubricant oil, which may consist essentially of a rust preventive additive (e.g., oil-soluble surfactant), a petroleum rosin (e.g., mineral oil, solvent), an oil layer modifier (e. g., mineral oil, crystalline polymer, viscous material), an oxidation inhibitor (e.g., phenolic oxidation inhibitor), a lubricant (e.g., extreme pressure agent), etc. The ordinary rust preventive oil includes, for example, a finger print remover-type rust preventive oil and a solvent cutback-type rust preventive oil which comprise a petroleum rosin base as dissolved or dispersed in a petroleum solvent, and also a rust preventive lubricating oil and a volatile rust preventive oil comprising, as the base, petrolactam and wax.

The coating weight of the layer of such rust preventive oil may be from 0.01 to 10 $g/m^2$. If it is smaller than 0.01 $g/m^2$, the coated steel sheet easily adheres onto a mold and therefore its press formability is poor. On the other hand, however, if it is larger than 10 $g/m^2$, it is difficult to completely remove the rust preventive oil from the coated steel sheet during degreasing the sheet prior to painting it.

In order to attain higher press formability and degreasibility of the coated steel sheet, the coating weight is preferably from 0.05 to 5 g/m$^2$.

EXAMPLES

Zinc or zinc alloy plated steel sheets were degreased with an alkali, rinsed with water, dried, chromate-treated, then coated with a coating composition by the use of a roll coater, baked, and thereafter coated with rust preventive oil or wash oil. The thus-prepared organic composite coated steel sheet samples were tested for their press formability, anti-powdering property, perforation corrosion resistance, corrosion resistance in a rust-contaminated environment, paint adhesion and weldability.

(1) Zinc or zinc alloy plated steel sheets:

(1-1) Non-plated steel sheets:

Non-plated steel sheets (thickness: 0.8 mm) used in the examples are shown in Table 1 and Table 2.

(1-2) Zinc or zinc alloy plating:

Zinc or zinc alloy plating compositions used in the examples for plating non-plated steel sheets, and the plating amounts are shown in Table 3.

(1-3) Zinc or zinc alloy plated steel sheets:

Zinc or zinc alloy plated steel sheets used in the examples are shown in Table 4.

(2) Chromate treatment:

(2-1) Dried-in-place chromate treatment:

A chromating solution having the composition shown below was applied onto the plated steel sheets, using a roll coater, which were then directly dried without being rinsed with water. The coating weight of the chromate layer formed was controlled by varying the ratio of the peripheral speed of the pickup rolls to that of the applicator rolls in the roll coater.

Chromic anhydride: 20 g/liter

Phosphate ion: 4 g/liter

Zirconium fluoride ion: 1 g/liter

Zinc ion: 1 g/liter

Hexavalent chromate ion/trivalent chromate ion=3/3 (by weight)

Chromic anhydride/zirconium fluoride ion=20/1 (by weight)

(2-2) Electrolytic chromate treatment:

A bath comprising 30 g/liter of chromic anhydride and 0. 2 g/liter of sulfuric acid and having a temperature of 40° C. was used for cathode electrolysis of zinc or zinc alloy plated steel sheets, at a current density of 10 A/dm$^2$, to form thereon a chromate layer. The thus-coated steel sheets were then rinsed with water and dried. The coating weight of the chromate layer was regulated by controlling the amount of the electric current employed for the electrolysis.

(2-3) Reacted-in-place chromate treatment:

A solution comprising 30 g/liter of chromic anhydride, 10 g/liter of phosphoric acid, 0.5 g/liter of NaF and 4 g/liter of $K_2TiF_6$ and having a temperature of 60° C. was sprayed over zinc or zinc alloy plated steel sheets, which were then rinsed with water and dried. The coating weight of the chromate layer formed was controlled by varying the time for the treatment.

(3) Organic resins:

Epoxy resin mixtures used in the examples for forming organic films are shown in Table 5. These were prepared according to the processes mentioned below.

(3-1) Base resin (A):

1880 g (0.5 mols) of Epicoat 1009 (bisphenol A-type epoxy resin, produced by Yuka Shell Epoxy Co., Ltd.) and 1000 g of a mixed solvent of methyl isobutyl ketone/xylene=1/1 (by weight) were put into a reactor equipped with a stirrer, a reflux condenser, a thermometer and a liquid dropping device, heated with stirring and dissolved uniformly at a temperature lower than the boiling point of the solvent. Next, the resulting solution was cooled to 70° C., to which was dropwise added 70 g of di(n-propanol)amine through the liquid dropping device, over a period of 30 minutes. During the addition, the reaction temperature was kept at 70° C. After the addition, this was kept at 120° C. for 2 hours to thereby complete the reaction. The resulting reaction product is referred to herein as base resin (A). The content of the effective ingredient in the base resin (A) was 66%.

(3-2) Polyisocyanate compound (Bi), trifunctional polyisocyanate:

222 parts of isophorone diisocyanate was put into a reactor equipped with a stirrer, a reflux condenser, a thermometer and a liquid dropping device, to which was added 100 parts of methyl isobutyl ketone. These were dissolved to give a uniform solution. The resulting isocyanate solution was kept at 70° C. with stirring, to which was dropwise added 88 parts of a methyl isobutyl ketone solution of 50% trimethylolpropane through the liquid dropping device, over a period of 1 hour. This was kept at 70° C. for 1 hour and then at 90° C. for further 1 hour. Next, 230 parts of n-butyl alcohol was added thereto and reacted at 90° C. for 3 hours to obtain a blocked isocyanate. The curing agent, blocked isocyanate is referred to as polyisocyanate compound (B1). The content of the effective ingredient in the polyisocyanate compound (Bi) was 76%.

(3-3) Polyisocyanate compound (B2), trifunctional polyisocyanate:

550 parts of Duranate TPA-110 (isocyanurate adduct of HMDI, produced by Asahi Chemical Industries, Ltd.) was put into a reactor equipped with a stirrer, a reflux condenser, a thermometer and a liquid dropping device, to which was added 34 parts of methyl isobutyl ketone. These were dissolved to give a uniform solution. The resulting isocyanate solution was kept at 70° C. with stirring, to which was dropwise added 270 parts of a methyl ethyl ketone oxime through the liquid dropping device, over a period of 2 hours. IR of the reaction product was measured, in which the absence of the absorption by isocyanato groups at from 2250 to 2270 cm$^{-1}$ was confirmed. Next, 47 parts of butyl cellosolve was added to this, from which was obtained a blocked isocyanate. The curing agent, blocked isocyanate is referred to as polyisocyanate compound (B2). The content of the effective ingredient in the polyisocyanate compound (B2) was 90%.

(3-4) Polyisocyanate compound (B3), hexafunctional polyisocyanate:

222 parts of isophorone diisocyanate was put into a reactor equipped with a stirrer, a reflux condenser, a thermometer and a liquid dropping device, to which was added 34 parts of methyl isobutyl ketone. These were dissolved to give a uniform solution. The resulting isocyanate solution was kept at 70° C. with stirring, to which was dropwise added 87 parts of a methyl ethyl ketone oxime through the liquid dropping device, over a period of 2 hours. Next, 30.4 parts of sorbitol was added to this, which was then heated and reacted at an elevated temperature of 120° C. IR of the reaction product was measured, in which the absence of the absorption by isocyanato groups at from 2250 to 2270 cm$^{-1}$ was confirmed. Next, 50.4 parts of butyl cellosolve was added to this, from which was obtained a blocked isocyanate. The curing agent, blocked isocyanate is referred to as polyisocyanate compound (B3). The content of the effective ingredient in the polyisocyanate compound (B3) was 80%.

(3-5) Polyisocyanate compound (B4), tetrafunctional polyisocyanate:

222 parts of isophorone diisocyanate and 34 parts of methyl isobutyl ketone were put into a reactor equipped with a thermometer, a stirrer and a reflux condenser connected with a dropping funnel, and uniformly dissolved. The uniform isocyanate solution was kept at 70° C. with stirring, to which was dropwise added 87 parts of a methyl ethyl ketone oxime through the dropping funnel, over a period of 2 hours. Next, 34 parts of pentaerythritol was added to this, which was then heated up to 120° C. and reacted at the elevated temperature of 120° C. IR of the reaction product was measured, in which the absence of the absorption by isocyanato groups at from 2250 to 2270 $cm^{-1}$ was confirmed. Next, 52 parts of butyl cellosolve was added to this, from which was obtained a curing agent, blocked isocyanate. The curing agent thus prepared herein is referred to as polyisocyanate compound (B4). The content of the effective ingredient in the polyisocyanate compound (B4) was 80%.

(3-6) Polyisocyanate compound (B5), hexamethylene diisocyanate-type hexafunctional polyisocyanate:

A hexamethylene diisocyanate-type hexafunctional polyisocyanate compound, Duranate MF-B80M (oxime-blocked, HMDI-type hexafunctional isocyanate, produced by Asahi Chemical Industries, Ltd.) was used as polyisocyanate compound (B5).

(3-7) Polyisocyanate compound (B6), difunctional polyisocyanate:

Takenate B-870N (MEK oxime-blocked IPDI, produced by Takeda Chemical Industries, Ltd.) was used as polyisocyanate compound (B6).

(4) Lubricants:

Lubricants added to the organic films in the examples are shown in Table 6 to Table 8.

Figure 7:
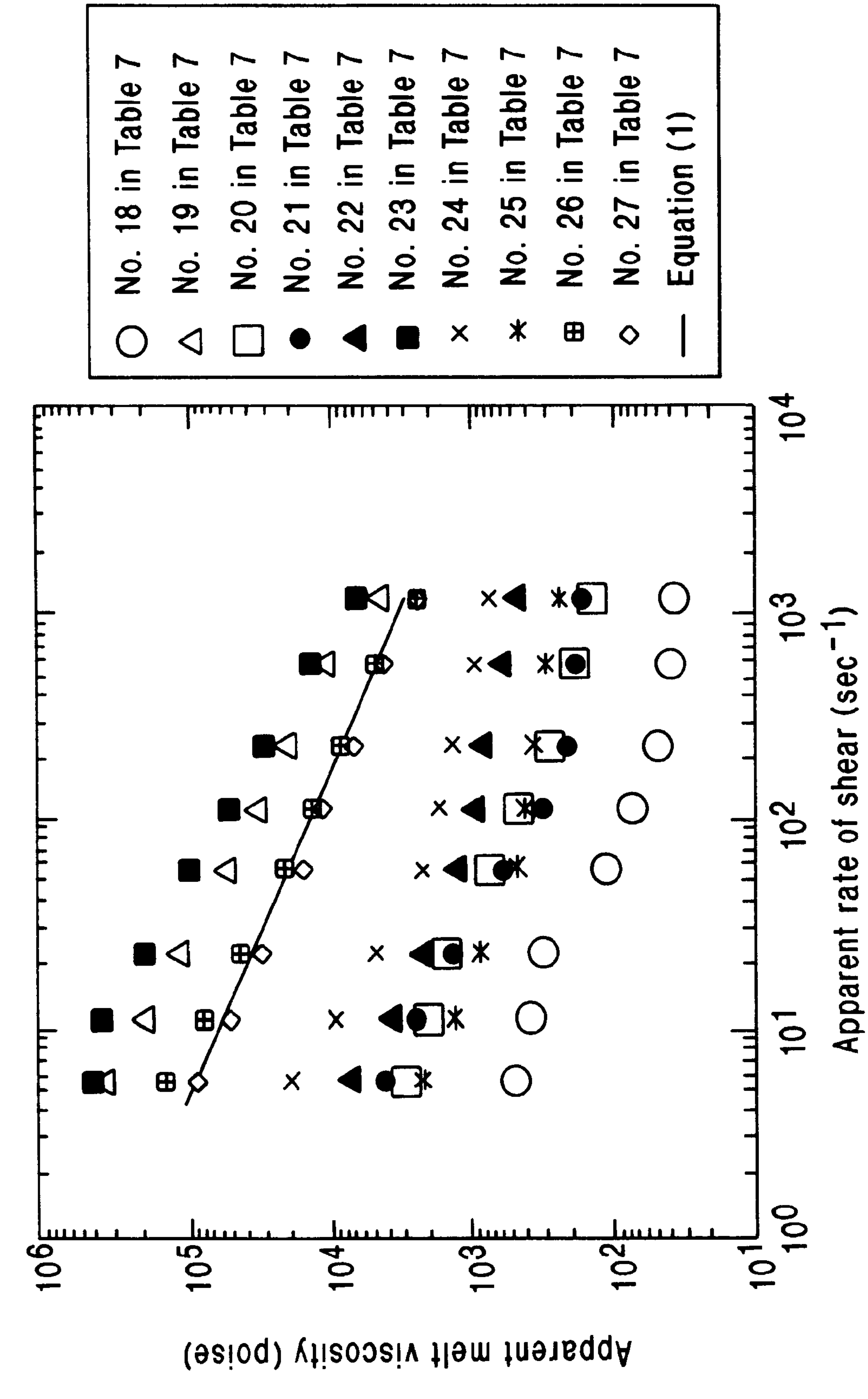
FIG. 7 is a graph showing the relationship between the apparent melt viscosity and the apparent rate of shear of various tetrafluoroethylene resin as shown in Table 7, which were measured according to the method for testing flow properties of resins with a capillary rheometer in accordance with JIS K7199.

FIG. 7 shows the data of the apparent melt viscosity of fine-powdery tetrafluoroethylene resins of No. 18 to No. 27 shown in Table 7, as measured according to the method for testing flow properties of resins with a capillary rheometer (based on JIS K7199). On the basis of these data, Table 7 indicates whether or not the fine-powdery tetrafluoroethylene resins shown therein satisfy the condition of the above-mentioned equation (1). The apparent melt viscosity of the fine-powdery tetrafluoroethylene resin No. 17 in Table 7 was sufficiently low to such a degree that it overstepped the measurable limit of the tester, and therefore the resin No. 17 satisfied the condition of the equation (1).

(5) Rust preventive Additives:

Rust preventive additives added to the organic films in the examples are shown in Table 9 and Table 10.

(6) Coating compositions:

As in Table 11 to Table 16, the lubricant and the rust preventive additive were added to and dispersed in each organic resin mentioned above, using a sand mill, to prepare coating composition No. 1 to No. 102. The constitution of each coating composition and the dispersion stability thereof are shown in Table 11 to Table 16. To determine their dispersion stability, these coating compositions were stored at 40° C. for one month, and the precipitation of the lubricant, if any, therein was checked. The dispersion stability was evaluated on the basis of the criteria mentioned below. The nonvolatile content of coating composition was 20% by weight.

⊚: No precipitate formed, and the composition did not changed.

○: Precipitates formed, but the composition was restored to its original condition after stirred lightly.

Δ: Precipitates formed, but the composition was restored to its original condition after stirred strongly.

×: Precipitates formed, and the composition was not restored to its original condition even after stirred strongly.

(7) Rust preventive oils:

Rust preventive oils used in the examples are shown in Table 17.

The constitutions of the organic composite coated steel sheet samples prepared in the manner mentioned hereinabove are shown in Table 18 to Table 34, along with their press formability, anti-powdering property, perforation corrosion resistance, paint adhesion, and weldability as determined according to the methods mentioned below. These samples comprising different lubricants were tested for their corrosion resistance in a rust-contaminated environment, and the data obtained are shown in Table 35 and Table 36.

The characteristics of the samples were tested and evaluated according to the following methods.

(a) Press formability:

Condition 1:

Each sample was cut into discs having a diameter of 110 ϕ, which were then drawn according to cylindrical deep drawing (diameter of punch: 50 mm, radius of punch shoulder: 5 mm, diameter of die: 53 mm, radius of die shoulder: 5 mm, BHF: 3.5 tons). The deep drawing height of each disc at which the disc cracked was measured, and this was compared with the data of the deep drawing height of various cold-rolled steel sheets (thickness: 0.8 mm) of different material levels.

Condition 2:

Each sample was cut into discs having a diameter of 110 ϕ, which were then drawn according to cylindrical deep drawing (diameter of punch: 50 mm, radius of punch shoulder: 5 mm, diameter of die: 53 mm, radius of die shoulder: 3 mm, BHF: 5.0 tons). The deep drawing height of each disc at which the disc cracked was measured, and this was compared with the data of the deep drawing height of various cold-rolled steel sheets (thickness: 0.8 mm) of different material levels.

The criteria for the determination of the press shapability of the samples as tested under the condition 1 and the condition 2 are as follows:

⊚: Better than EDDQ cold rolled steel sheet (No. 8 in Table 1).

○+: Same as EDDQ cold rolled steel sheet (No. 8 in Table 1).

○: Same as DDQ cold rolled steel sheet (No. 6 in Table 1).

Δ: Same as DQ cold rolled steel sheet (No. 4 in Table 1).

×: Same as or worse than CQ cold rolled steel sheet (No. 1 in Table 1).

For the samples, No. 1 and No. 13 through No. 25, the acceptable deep drawing height of each disc as measured under the condition 2 was compared with the data of the deep drawing height of various cold-rolled steel sheets (thickness: 0.8 mm) of different material levels as measured under the condition 1, and was indicated by the indices mentioned below. These indices reflect more clearly the influence of the materials constituting the samples on the press formability thereof. The indices of the tested samples are shown in the column for the press formability under the condition 2 in the tables.

5: Better than EDDQ cold rolled steel sheet (No. 8 in Table 1).

4: Same as EDDQ cold rolled steel sheet (No. 8 in Table 1).

3: Same as DDQ cold rolled steel sheet (No. 6 in Table 1).

2: Same as DQ cold rolled steel sheet (No. 4 in Table 1).

1: Same as or worse than CQ cold rolled steel sheet (No. 1 in Table 1).

(b) Anti-powdering property:

Each sample was cut into strips having a width of 30 mm, which were then subjected to a draw bead test in which the radius of the bead tip was 0.5 mm, the height of the bead was 4 mm, the pressing power was 500 kgf, and the drawing speed was 200 mm/min. After the test, an adhesive tape was attached to the part of each sample that had been slid against the bead, and peeled off. The amount in a predetermined unit area as peeled with the adhesive tape was measured, before and after the test. From the data measured, the anti-powdering property of each sample was determined according to the following criteria.

◎: Less than 2 g/$m^2$

○: From 2 g/$m^2$ to less than 3 g/$m^2$

○−: From 3 g/$m^2$ to less than 4 g/$m^2$

Δ: From 4 g/$m^2$ to less than 6 g/$m^2$

×: 6 g/$m^2$ or more (c) Perforation corrosion resistance:

Each sample was degreased with FCL-4460 (product of Nippon Parkerizing Co., Ltd.) under an ordinary condition, and its edges and back surface were sealed with tape. This was then subjected to an accelerated corrosion test, for which one corrosion cycle is mentioned below, for a total of 300 cycles. After the test, the maximum depth of perforation corrosion in each sample was measured.

Cycle of accelerated corrosion test:

Spraying of NaCl solution over sample for 4 hours

↓

Drying at 60° C. for 2 hours

↓

Humidity cabinet test (at 50° C., at relative humidity of 95%), for 2 hours

The criteria for the perforation corrosion resistance are as follows:

◎: Smaller than 0.15 mm

○: From 0.15 mm to smaller than 0.3 mm

○−: From 0.3 mm to smaller than 0.45 mm

Δ: From 0.45 mm to smaller than 0.6 mm

×: 0.6 mm or larger (d) Paint adhesion:

A paint, U-600 (product of Nippon Paint Co., Ltd.) was applied to each sample by electrodeposition to form a paint layer of 25 μm thick. Then, an intermediate coat (30 μm) of KPX-36 (product of Kansai Paint Co., Ltd.) was formed thereon. Further, a top coat (35 μm) of LUGA BAKE B-531 was formed on the intermediate coat.

The thus-coated sample was dipped in ion-exchanged water at 40° C. for 240 hours, and then taken out. After having been left at room temperature for 24 hours, 100 checkers each measuring 2 mm square were made in the coating, and an adhesive tape was attached to, and detached from, the coating to see how the coating would peel off. The paint adhesion of each sample was evaluated according to the following criteria.

◎: No peeling occurred.

○: Only less than 3% of the coating peeled off.

Δ: From 3% to less than 10% of the coating peeled off.

×: 10% or more of the coating peeled off.

(e) Weldability:

A continuous spot welding test was made on each sample, in which a DR-type alumina dispersion copper electrode having a tip diameter of 6 mm was used, the electrode force was 200 kgf, the welding time was 10 cycles/50 Hz, and the welding current was 10 kA. The number of the spots made continuously on the sample was counted, from which the weldability of the sample was evaluated in accordance with the criteria mentioned below.

◎: 3000 points or more

○: From 2000 points to less than 3000 points

Δ: From 1000 points to less than 2000 points

×: Less than 1000 points.

(f) Corrosion resistance in rust-contaminated environment;

Each sample was degreased with FCL-4460 (product of Nippon Parkerizing Co., Ltd.) under an ordinary condition, and its edges and back surface were sealed with tape. This was then subjected to a composite corrosion test in a rust-contaminated environment, for which one corrosion cycle is mentioned below, for a total of 7 cycles (condition 1) and 15 cycles (condition 2).

Cycle of composite corrosion test:

Dipping in 5% NaCl solution in the presence of iron rust (*Note), at 50° C. for 18 hours

↓

Humidity cabinet test, at 50° C. and at relative humidity of 95%, for 3 hours

↓

Drying at 60° C. for 3 hours (*Note) Means of providing iron rust in the testing environment: A cold rolled steel strip of 10 $cm^2$/liter was dipped in the NaCl solution.

The criteria for the corrosion resistance in the rust-contaminated environment are as follows:

◎: No red rust formed.

○+: Red rust covered over an area of less than 5%.

○: Red rust covered over an area of from 5% to less than 10%.

○−: Red rust covered over an area of from 10% less than 20%.

Δ: Red rust covered over an area of from 20% to less than 50%.

×: Red rust covered over an area of 50% or more.

*1 to *6 as referred to in Table 11 to Table 16 are as follows:

*1: Number of organic resin shown in Table 5.

*2: % by weight of nonvolatile content.

*3: Number of lubricant shown in Table 6 to Table 8.

*4: Ratio by weight of nonvolatile contents.

*5: Number of rust preventive additive shown in Table 9.

*6: Number of rust preventive additive shown in Table 10.

*1 to *5 as referred to in Table 18 to Table 34 are as follows:

*1: Inv.: Sample of the invention
Comp.: Comparative sample

*2: Number of plated steel sheet in Table 4

*3: Amount of chromate coated, in terms of metallic chromium.

*4: Number of coating composition shown in Table 11 to Table 16.

*5: Number of rust preventive oil shown in Table 17.

TABLE 1

[Non-plated Steel Sheets]

| | | Chemical Composition (%) | | | | | | | | | |
|---|---|---|---|---|---|---|---|---|---|---|---|
| No. | Grade of Material | C | Si | Mn | P | S | Sol. Al | N | Nb | Ti | B |
| 1 | CQ | 0.0190 | 0.02 | 0.19 | 0.016 | 0.012 | 0.055 | 0.0025 | tr. | tr. | tr. |
| 2 | CQ | 0.0420 | 0.02 | 0.21 | 0.018 | 0.015 | 0.025 | 0.0031 | tr. | tr. | tr. |
| 3 | DQ | 0.0025 | 0.02 | 0.16 | 0.012 | 0.009 | 0.041 | 0.0022 | 0.016 | 0.026 | tr. |
| 4 | DQ | 0.0018 | 0.01 | 0.14 | 0.009 | 0.008 | 0.045 | 0.0020 | tr. | 0.038 | 0.0006 |
| 5 | DDQ | 0.0021 | 0.01 | 0.16 | 0.010 | 0.008 | 0.041 | 0.0018 | 0.012 | 0.033 | tr. |
| 6 | DDQ | 0.0020 | 0.02 | 0.12 | 0.009 | 0.009 | 0.045 | 0.0021 | tr. | 0.043 | 0.0007 |
| 7 | EDDQ | 0.0025 | 0.01 | 0.16 | 0.008 | 0.007 | 0.030 | 0.0020 | tr. | 0.072 | tr. |
| 8 | EDDQ | 0.0018 | 0.02 | 0.17 | 0.009 | 0.006 | 0.042 | 0.0022 | tr. | 0.065 | 0.0005 |
| 9 | 35BH | 0.0025 | 0.15 | 0.63 | 0.022 | 0.008 | 0.065 | 0.0025 | 0.011 | tr. | tr. |
| 10 | 35BH | 0.0020 | 0.02 | 0.65 | 0.042 | 0.009 | 0.068 | 0.0021 | 0.012 | tr. | tr. |
| 11 | 40S | 0.0026 | 0.02 | 0.93 | 0.076 | 0.008 | 0.050 | 0.0022 | tr. | 0.042 | 0.0007 |
| 12 | 40S | 0.0031 | 0.21 | 1.42 | 0.034 | 0.007 | 0.043 | 0.0025 | tr. | 0.055 | tr. |
| 13 | 45S | 0.0025 | 0.43 | 1.52 | 0.073 | 0.008 | 0.041 | 0.0026 | tr. | 0.049 | 0.0009 |
| 14 | 45S | 0.0032 | 0.49 | 1.91 | 0.033 | 0.005 | 0.032 | 0.0031 | tr. | 0.075 | tr. |

CQ, DQ, EDDQ: Formable cold rolled steel sheets
40S, 45S: High-tension steel sheets
35BH: Bake-hardenable, high-tension steel sheets

TABLE 2

Non-plated Steel Sheets

| No. | Y P ($kgf/mm^2$) | T S ($kgf/mm^2$) | E 1 (%) | n value (-) | $\bar{r}$ value (-) |
|---|---|---|---|---|---|
| 1 | 21.2 | 33.1 | 43.8 | 0.208 | 1.43 |
| 2 | 23.5 | 34.0 | 42.5 | 0.197 | 1.31 |
| 3 | 17.6 | 32.2 | 46.1 | 0.242 | 1.75 |
| 4 | 17.3 | 31.8 | 46.8 | 0.245 | 1.78 |
| 5 | 17.1 | 31.9 | 47.0 | 0.243 | 1.79 |
| 6 | 16.9 | 31.6 | 47.5 | 0.247 | 1.81 |
| 7 | 16.3 | 31.5 | 51.0 | 0.251 | 2.05 |
| 8 | 15.8 | 31.3 | 51.5 | 0.254 | 2.11 |
| 9 | 25.4 | 35.2 | 41.5 | 0.203 | 1.53 |
| 10 | 24.3 | 35.9 | 44.3 | 0.211 | 1.65 |
| 11 | 23.3 | 40.3 | 39.5 | 0.200 | 1.63 |
| 12 | 24.1 | 40.8 | 41.3 | 0.201 | 1.58 |
| 13 | 28.3 | 45.2 | 36.2 | 0.210 | 1.55 |
| 14 | 28.9 | 46.0 | 37.8 | 0.205 | 1.63 |

TABLE 3

[Means of Zinc or Zinc Alloy Plating]

| No. | Type |
|---|---|
| 1 | Zn-12% Ni alloy electroplating (coating weight 30 $g/m^2$) |
| 2 | Zn-15% Fe alloy electroplating (coating weight 40 $g/m^2$) |
| 3 | Electrogalvanization plating (coating weight 40 $g/m^2$) |
| 4 | Hot-dipping galvanization plating (coating weight 90 $g/m^2$) |
| 5 | Galvannealing plating (coating weight 60 $g/m^2$) |
| 6 | Two-layer galvannealing plating (coating weight of upper layer: 5 $g/m^2$, coating weight of lower layer: 60 $g/m^2$) |
| 7 | Zn-5% Al-0.5% Mo alloy hot-dipping plating (coating weight 90 $g/m^2$) |
| 8 | Zn-55% Al-1.6% Si alloy hot-dipping plating (coating weight 90 $g/m^2$) |
| 9 | Zn-12% Cr alloy electroplating (coating weight 20 $g/m^2$) |
| 10 | Zn-12% Cr-12% Ni alloy electroplating (coating weight 20 $g/m^2$) |

(Note) Both surfaces of each sample were plated in the same manner.

TABLE 4

Zinc or Zinc Alloy Plated Steel Sheets

| No. | Non-plated steel sheet *1 | Type of plating *2 |
|---|---|---|
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 10 | 10 | 1 |
| 11 | 11 | 1 |
| 12 | 12 | 1 |
| 13 | 13 | 1 |
| 14 | 14 | 1 |
| 15 | 4 | 2 |
| 16 | 4 | 3 |
| 17 | 4 | 4 |
| 18 | 4 | 5 |
| 19 | 4 | 6 |
| 20 | 4 | 7 |
| 21 | 4 | 8 |
| 22 | 4 | 9 |
| 23 | 4 | 10 |

*1 Number of non-plated steel sheet shown in Table 1 and Table 2.
*2 Number of zinc or zinc alloy plating means shown in Table 3.

TABLE 5

[Organic Resins]

| No. | Base resin | Curing agent | Base resin/Curing agent ※1 |
|---|---|---|---|
| 1 | Base resin (A) | Polyisocyanate compound (B1) | 95/5 |
| 2 | Base resin (A) | Polyisocyanate compound (B1) | 90/10 |
| 3 | Base resin (A) | Polyisocyanate compound (B1) | 65/35 |
| 4 | Base resin (A) | Polyisocyanate compound (B1) | 55/45 |
| 5 | Base resin (A) | Polyisocyanate compound (B1) | 99/1 |
| 6 | Base resin (A) | Polyisocyanate compound (B1) | 40/60 |
| 7 | Base resin (A) | Polyisocyanate compound (B2) | 90/10 |
| 8 | Base resin (A) | Polyisocyanate compound (B3) | 90/10 |
| 9 | Base resin (A) | Polyisocyanate compound (B4) | 90/10 |
| 10 | Base resin (A) | Polyisocyanate compound (B5) | 90/10 |
| 11 | Base resin (A) | Polyisocyanate compound (B6) | 90/10 |
| 12 | Base resin (A) was made soluble in water, by adding acetic acid (30 g/liter) thereto | | |

※1: Ratio by weight of nonvolatile contents

TABLE 6

[Lubricants: Polyethylene Waxes]

| No. | Production method *1 | Mean molecular weight | Softening point (° C.) | Density (g/cm$^2$) | Acid value KOH (mg/m$^2$) | Copolymerization with $\alpha$-olefin |
|---|---|---|---|---|---|---|
| 1 | (a) | 700 | 110 | 0.95 | — | No |
| 2 | (a) | 900 | 121 | 0.95 | — | No |
| 3 | (a) | 1500 | 125 | 0.97 | — | No |
| 4 | (a) | 3000 | 125 | 0.97 | — | No |
| 5 | (a) | 3500 | 130 | 0.97 | — | No |
| 6 | (a) | 4000 | 136 | 0.98 | — | No |
| 7 | (a) | 4500 | 140 | 0.97 | — | No |
| 8 | (a) | 5000 | 136 | 0.97 | — | No |
| 9 | (a) | 500 | 115 | 0.97 | — | No |
| 10 | (a) | 3000 | 145 | 0.97 | — | No |
| 11 | (a) | 2000 | 113 | 0.92 | — | Yes |
| 12 | (a) | 3000 | 114 | 0.93 | — | Yes |
| 13 | (a) | 3200 | 120 | 0.97 | 12 | No |
| 14 | (a) | 2700 | 111 | 0.93 | 30 | No |
| 15 | (b) | 2500 | 115 | 0.93 | — | No |
| 16 | (c) | 2800 | 117 | 0.92 | — | No |

*1(a): Coordination-anionic polymerization using a Ziegler catalyst
(b): Radical polymerization using a radical catalyst
(c): Pyrolysis of ordinary shaping polyethylene

TABLE 7

[Lubricants: Fine-powdery Fluorine Resins]

| No. | Type (trade name) | Specific surface area (m$^2$/g) | Particle size ($\mu$m) | Condition of equation (1) for apparent melt viscosity |
|---|---|---|---|---|
| 17 | FLUON L155J, product of Asahi-ICI Fluoropolymers Co., Ltd. | 1.5 | 4.0 | Satisfied *1 |
| 18 | FLUON L140J, product of Asahi-ICI Fluoropolymers Co., Ltd. | 2.1 | 3.0 | Satisfied |
| 19 | FLUON L150J, product of Asahi-ICI Fluoropolymers Co., Ltd. | 1.3 | 7.0 | Not satisfied |
| 20 | Teflon MP1100, product of Du Pont-Mitsui Fluorochemicals Co., Ltd. | 8 | 3.0 | Satisfied |
| 21 | Teflon MP1125, product of Du Pont-Mitsui Fluorochemicals Co., Ltd. | 8 | 3.0 | Satisfied |
| 22 | Teflon MP1200, product of Du Pont-Mitsui Fluorochemicals Co., Ltd. | 3 | 3.5 | Satisfied |
| 23 | Teflon TLP10F-1, product of Du Pont-Mitsui Fluorochemicals Co., Ltd. | 8 | 3.0 | Not satisfied |
| 24 | SST-1MG, product of Shamrock Chemicals Co. | 9.1 | 1.0 | Satisfied |
| 25 | TL10, product of ICI Fluoropolymers Co. | 3 | 3.4 | Satisfied |
| 26 | TL102-2, product of ICI Fluoropolymers Co. | 8 | 2.0 | Not satisfied |
| 27 | Hostaflon TF9202, product of Hoechst Japan Limited | 15 | 2.5 | Satisfied |

*1: The apparent melt viscosity of No. 17 was sufficiently low to such a degree that it overstepped the measurable limit of the tester, and therefore No. 17 satisfied the condition of the equation (1).

TABLE 8

| No. | Compound |
|---|---|
| | Other Lubricants |
| 28 | Graphite (mean particle size: 0.8 $\mu$m) |
| 29 | Boron nitride (mean particle size: 0.7 $\mu$m) |
| 30 | Fine powder of molybdenum disulfide (mean particle size: 0.4 $\mu$m) |
| 31 | Oily or fatty extreme pressure agent |
| 32 | Carbon fluoride (mean particle size: 5 $\mu$m) |

TABLE 10

| No. | Compound |
|---|---|
| | Rust Preventive Additives, Sparingly Soluble Chromates |
| 1 | Barium chromate (product of Kikuchi Pigment Industrial Co., Ltd.) |
| 2 | Strontium chromate (product of Kikuchi Pigment Industrial Co., Ltd.) |
| 3 | Calcium chromate (product of Kikuchi Pigment Industrial Co., Ltd.) |

TABLE 10-continued

| No. | Compound |
|---|---|
| | Rust Preventive Additives, Sparingly Soluble Chromates |
| 4 | Zinc chromate (ZTO) (product of Kikuchi Pigment Industrial Co., Ltd.) |
| 5 | Potassium zinc chromate (ZTO) (product of Kikuchi Pigment Industrial Co., Ltd.) |

TABLE 17

| No. | Type |
|---|---|
| | Rust Preventive Oils |
| 1 | Rust preventive oil (NOX-RUST 530F, product of Parker Industries, Inc.) |
| 2 | Rust preventive oil (Daphne Oil Coat SK, product of Nippon Oil Co., Ltd.) |
| 3 | Rust preventive wash oil (PRETON R303P, product of Sugimura Chemical Industrial Co., Ltd. ) |
| 4 | Rust preventive wash oil (RUSTCLEAN K, product of Nippon Oil Co., Ltd.) |
| 5 | Rust preventive wash oil (P-1600B, product of Nippon Oil Co., Ltd.) |
| 6 | Rust preventive lubricating oil (NOX-RUST 550HX, product of Parker Industries, Inc.) |
| 7 | High-quality, rust preventive lubricating oil (NOX-RUST Mu-10, product of Parker Industries, Inc.) |

TABLE 9

| No. | Compound |
|---|---|
| | [Rust Preventive Additives: Silica] |
| 1 | AEROSIL R811, product of Nippon Aerosil Co., Ltd. (fumed silica; hydrophobic) |
| 2 | AEROSIL R974, product of Nippon Aerosil Co., Ltd. (fumed silica; hydrophobic) |
| 3 | AEROSIL R805, product of Nippon Aerosil Co., Ltd. (fumed silica; hydrophobic) |
| 4 | AEROSIL R202, product of Nippon Aerosil Co., Ltd. (fumed silica; hydrophobic) |
| 5 | AEROSIL 200, product of Nippon Aerosil Co., Ltd. (fumed silica; hydrophilic) |
| 6 | AEROSIL 380, product of Nippon Aerosil Co., Ltd. (fumed silica; hydrophilic) |
| 7 | ETC-ST, product of Nissan Chemical Industries, Ltd. (organosilica sol; hydrophilic) |
| 8 | Fine Seal T-32(S), product of Tokuyama Soda Co., Ltd. (silica of the precipitated type obtained by the reaction of sodium silicate and mineral acids; hydrophilic) |
| 9 | Syloid 244, product of Fuji-Davison Chemical, Ltd. (silica of the gel type obtained by the reaction of sodium silicate and mineral acids; hydrophilic) |
| 10 | SHIELDEX, product of Fuji-Davison Chemical, Ltd. (calcium-exchanged silica; hydrophilic) |

TABLE 11

[Coating Compositions]

| | | | Lubricant | | | | | Rust preventive additive | | | | | |
|---|---|---|---|---|---|---|---|---|---|---|---|---|---|
| | Resin | | First component | | Second component | | Ratio of first component/ | First component | | Second component | | Ratio of first component/ | |
| No. | Compound *1 | Amount added *2 | Compound *3 | Amount added *2 | Compound *3 | Amount added *2 | second component *4 | Compound *5 | Amount added *2 | Compound *6 | Amount added *2 | second component *4 | Dispersion stability |
| 1 | (2) | 50 | (17) | 9 | (1) | 9 | 50/50 | (1) | 24 | (1) | 8 | 75/25 | ◎ |
| 2 | (2) | 50 | (17) | 9 | (2) | 9 | 50/50 | (1) | 24 | (1) | 8 | 75/25 | ◎ |
| 3 | (2) | 50 | (17) | 9 | (3) | 9 | 50/50 | (1) | 24 | (1) | 8 | 75/25 | ◎ |
| 4 | (2) | 50 | (17) | 9 | (4) | 9 | 50/50 | (1) | 24 | (1) | 8 | 75/25 | ◎ |
| 5 | (2) | 50 | (17) | 9 | (5) | 9 | 50/50 | (1) | 24 | (1) | 8 | 75/25 | ◎ |

TABLE 11-continued

[Coating Compositions]

| | Resin | | Lubricant | | | | | Rust preventive additive | | | | | |
|---|---|---|---|---|---|---|---|---|---|---|---|---|---|
| | | | First component | | Second component | | Ratio of first component/ | First component | | Second component | | Ratio of first component/ | |
| No. | Compound *1 | Amount added *2 | Compound *3 | Amount added *2 | Compound *3 | Amount added *2 | second component *4 | Compound *5 | Amount added *2 | Compound *6 | Amount added *2 | second component *4 | Dispersion stability |
| 6 | (2) | 50 | (17) | 9 | (6) | 9 | 50/50 | (1) | 24 | (1) | 8 | 75/25 | ◎ |
| 7 | (2) | 50 | (17) | 9 | (7) | 9 | 50/50 | (1) | 24 | (1) | 8 | 75/25 | ◎ |
| 8 | (2) | 50 | (17) | 9 | (8) | 9 | 50/50 | (1) | 24 | (1) | 8 | 75/25 | ◎ |
| 9 | (2) | 50 | (17) | 9 | (9) | 9 | 50/50 | (1) | 24 | (1) | 8 | 75/25 | ◎ |
| 10 | (2) | 50 | (17) | 9 | (10) | 9 | 50/50 | (1) | 24 | (1) | 8 | 75/25 | ◎ |
| 11 | (2) | 50 | (17) | 9 | (11) | 9 | 50/50 | (1) | 24 | (1) | 8 | 75/25 | ◎ |
| 12 | (2) | 50 | (17) | 9 | (12) | 9 | 50/50 | (1) | 24 | (1) | 8 | 75/25 | ◎ |
| 13 | (2) | 50 | (17) | 9 | (13) | 9 | 50/50 | (1) | 24 | (1) | 8 | 75/25 | ◎ |
| 14 | (2) | 50 | (17) | 9 | (14) | 9 | 50/50 | (1) | 24 | (1) | 8 | 75/25 | ◎ |
| 15 | (2) | 50 | (17) | 9 | (15) | 9 | 50/50 | (1) | 24 | (1) | 8 | 75/25 | ◎ |
| 16 | (2) | 50 | (17) | 9 | (16) | 9 | 50/50 | (1) | 24 | (1) | 8 | 75/25 | ◎ |
| 17 | (2) | 50 | (3) | 9 | (18) | 9 | 50/50 | (1) | 24 | (1) | 8 | 75/25 | ◎ |

TABLE 12

[Coating Compositions]

| | Resin | | Lubricant | | | | | Rust preventive additive | | | | | |
|---|---|---|---|---|---|---|---|---|---|---|---|---|---|
| | | | First component | | Second component | | Ratio of first component/ | First component | | Second component | | Ratio of first component/ | |
| No. | Compound *1 | Amount added *2 | Compound *3 | Amount added *2 | Compound *3 | Amount added *2 | second component *4 | Compound *5 | Amount added *2 | Compound *6 | Amount added *2 | second component *4 | Dispersion stability |
| 18 | (2) | 50 | (3) | 9 | (19) | 9 | 50/50 | (1) | 24 | (1) | 8 | 75/25 | ◎ |
| 19 | (2) | 50 | (3) | 9 | (20) | 9 | 50/50 | (1) | 24 | (1) | 8 | 75/25 | ○ |
| 20 | (2) | 50 | (3) | 9 | (21) | 9 | 50/50 | (1) | 24 | (1) | 8 | 75/25 | ○ |
| 21 | (2) | 50 | (3) | 9 | (22) | 9 | 50/50 | (1) | 24 | (1) | 8 | 75/25 | ◎ |
| 22 | (2) | 50 | (3) | 9 | (23) | 9 | 50/50 | (1) | 24 | (1) | 8 | 75/25 | ○ |
| 23 | (2) | 50 | (3) | 9 | (24) | 9 | 50/50 | (1) | 24 | (1) | 8 | 75/25 | ○ |
| 24 | (2) | 50 | (3) | 9 | (25) | 9 | 50/50 | (1) | 24 | (1) | 8 | 75/25 | ◎ |
| 25 | (2) | 50 | (3) | 9 | (26) | 9 | 50/50 | (1) | 24 | (1) | 8 | 75/25 | ○ |
| 26 | (2) | 50 | (3) | 9 | (27) | 9 | 50/50 | (1) | 24 | (1) | 8 | 75/25 | X |
| 27 | (2) | 50 | (3) | 9 | (28) | 9 | 50/50 | (1) | 24 | (1) | 8 | 75/25 | ◎ |
| 28 | (2) | 50 | (3) | 9 | (29) | 9 | 50/50 | (1) | 24 | (1) | 8 | 75/25 | ◎ |
| 29 | (2) | 50 | (3) | 9 | (30) | 9 | 50/50 | (1) | 24 | (1) | 8 | 75/25 | ◎ |
| 30 | (2) | 50 | (3) | 9 | (31) | 9 | 50/50 | (1) | 24 | (1) | 8 | 75/25 | ◎ |
| 31 | (2) | 50 | (3) | 9 | (32) | 9 | 50/50 | (1) | 24 | (1) | 8 | 75/25 | ◎ |
| 32 | (2) | 50 | (17) | 9 | (28) | 9 | 50/50 | (1) | 24 | (1) | 8 | 75/25 | ◎ |
| 33 | (2) | 50 | (17) | 9 | (29) | 9 | 50/50 | (1) | 24 | (1) | 8 | 75/25 | ◎ |
| 34 | (2) | 50 | (17) | 9 | (30) | 9 | 50/50 | (1) | 24 | (1) | 8 | 75/25 | ◎ |

TABLE 13

[Coating Compositions]

| | Resin | | Lubricant | | | | | Rust preventive additive | | | | | |
|---|---|---|---|---|---|---|---|---|---|---|---|---|---|
| | | | First component | | Second component | | Ratio of first component/ | First component | | Second component | | Ratio of first component/ | |
| No. | Compound *1 | Amount added *2 | Compound *3 | Amount added *2 | Compound *3 | Amount added *2 | second component *4 | Compound *5 | Amount added *2 | Compound *6 | Amount added *2 | second component *4 | Dispersion stability |
| 35 | (2) | 50 | (17) | 9 | (31) | 9 | 50/50 | (1) | 24 | (1) | 8 | 75/25 | ◎ |
| 36 | (2) | 50 | (17) | 9 | (32) | 9 | 50/50 | (1) | 24 | (1) | 8 | 75/25 | ◎ |
| 37 | (2) | 50 | (17) | 0 | (3) | 18 | 0/100 | (1) | 24 | (1) | 8 | 75/25 | ◎ |
| 38 | (2) | 50 | (17) | 1.8 | (3) | 16.2 | 10/90 | (1) | 24 | (1) | 8 | 75/25 | ◎ |
| 39 | (2) | 50 | (17) | 5.4 | (3) | 12.6 | 30/70 | (1) | 24 | (1) | 8 | 75/25 | ◎ |
| 40 | (2) | 50 | (17) | 12.6 | (3) | 5.4 | 70/30 | (1) | 24 | (1) | 8 | 75/25 | ◎ |

TABLE 13-continued

[Coating Compositions]

| No. | Resin | | Lubricant | | | | | Rust preventive additive | | | | | Dispersion stability |
|---|---|---|---|---|---|---|---|---|---|---|---|---|---|
| | | | First component | | Second component | | Ratio of first component/ second component *4 | First component | | Second component | | Ratio of first component/ second component *4 | |
| | Compound *1 | Amount added *2 | Compound *3 | Amount added *2 | Compound *3 | Amount added *2 | | Compound *5 | Amount added *2 | Compound *6 | Amount added *2 | | |
| 41 | (2) | 50 | (17) | 16.2 | (3) | 1.8 | 90/10 | (1) | 24 | (1) | 8 | 75/25 | ◎ |
| 42 | (2) | 50 | (17) | 18 | (3) | 0 | 100/0 | (1) | 24 | (1) | 8 | 75/25 | ◎ |
| 43 | (1) | 50 | (17) | 9 | (3) | 9 | 50/50 | (1) | 24 | (1) | 8 | 75/25 | ◎ |
| 44 | (3) | 50 | (17) | 9 | (3) | 9 | 50/50 | (1) | 24 | (1) | 8 | 75/25 | ◎ |
| 45 | (4) | 50 | (17) | 9 | (3) | 9 | 50/50 | (1) | 24 | (1) | 8 | 75/25 | ◎ |
| 46 | (5) | 50 | (17) | 9 | (3) | 9 | 50/50 | (1) | 24 | (1) | 8 | 75/25 | ◎ |
| 47 | (6) | 50 | (17) | 9 | (3) | 9 | 50/50 | (1) | 24 | (1) | 8 | 75/25 | ◎ |
| 48 | (7) | 50 | (17) | 9 | (3) | 9 | 50/50 | (1) | 24 | (1) | 8 | 75/25 | ◎ |
| 49 | (8) | 50 | (17) | 9 | (3) | 9 | 50/50 | (1) | 24 | (1) | 8 | 75/25 | ◎ |
| 50 | (12) | 50 | (17) | 9 | (3) | 9 | 50/50 | (1) | 24 | (1) | 8 | 75/25 | ◎ |
| 51 | (2) | 50 | (17) | 9 | (3) | 9 | 50/50 | (2) | 24 | (1) | 8 | 75/25 | ◎ |

TABLE 14

[Coating Compositions]

| No. | Resin | | Lubricant | | | | | Rust preventive additive | | | | | Dispersion stability |
|---|---|---|---|---|---|---|---|---|---|---|---|---|---|
| | | | First component | | Second component | | Ratio of first component/ second component *4 | First component | | Second component | | Ratio of first component/ second component *4 | |
| | Compound *1 | Amount added *2 | Compound *3 | Amount added *2 | Compound *3 | Amount added *2 | | Compound *5 | Amount added *2 | Compound *6 | Amount added *2 | | |
| 52 | (2) | 50 | (17) | 9 | (3) | 9 | 50/50 | (3) | 24 | (1) | 8 | 75/25 | ◎ |
| 53 | (2) | 50 | (17) | 9 | (3) | 9 | 50/50 | (4) | 24 | (1) | 8 | 75/25 | ◎ |
| 54 | (2) | 50 | (17) | 9 | (3) | 9 | 50/50 | (5) | 24 | (1) | 8 | 75/25 | ◎ |
| 55 | (2) | 50 | (17) | 9 | (3) | 9 | 50/50 | (6) | 24 | (1) | 8 | 75/25 | ◎ |
| 56 | (2) | 50 | (17) | 9 | 3) | 9 | 50/50 | (7) | 24 | (1) | 8 | 75/25 | ◎ |
| 57 | (2) | 50 | (17) | 9 | (3) | 9 | 50/50 | (8) | 24 | (1) | 8 | 72/25 | ◎ |
| 58 | (2) | 50 | (17) | 9 | (3) | 9 | 50/50 | (9) | 24 | (1) | 8 | 72/25 | ◎ |
| 59 | (2) | 50 | (17) | 9 | (3) | 9 | 50/50 | (10) | 24 | (1) | 8 | 72/25 | ◎ |
| 60 | (2) | 50 | (17) | 9 | (3) | 9 | 50/50 | (1) | 24 | (2) | 8 | 72/25 | ◎ |
| 61 | (2) | 50 | (17) | 9 | (3) | 9 | 50/50 | (1) | 24 | (3) | 8 | 72/25 | ◎ |
| 62 | (2) | 50 | (17) | 9 | (3) | 9 | 50/50 | (1) | 24 | (4) | 8 | 72/25 | ◎ |
| 63 | (2) | 50 | (17) | 9 | (3) | 9 | 50/50 | (1) | 24 | (5) | 8 | 72/25 | ◎ |
| 64 | (2) | 50 | (17) | 9 | (3) | 9 | 50/50 | (1) | 32 | (1) | 0 | 100/0 | ◎ |
| 65 | (2) | 50 | (17) | 9 | (3) | 9 | 50/50 | (1) | 30.4 | (1) | 1.6 | 95/5 | ◎ |
| 66 | (2) | 50 | (17) | 9 | (3) | 9 | 50/50 | (1) | 28.8 | (1) | 3.2 | 90/10 | ◎ |
| 67 | (2) | 50 | (17) | 9 | (3) | 9 | 50/50 | (1) | 27.2 | (1) | 4.8 | 80/20 | ◎ |
| 68 | (2) | 50 | (17) | 9 | (3) | 9 | 50/50 | (1) | 16 | (1) | 16 | 50/50 | ◎ |

TABLE 15

[Coating Compositions]

| No. | Resin | | Lubricant | | | | | Rust preventive additive | | | | | Dispersion stability |
|---|---|---|---|---|---|---|---|---|---|---|---|---|---|
| | | | First component | | Second component | | Ratio of first component/ second component *4 | First component | | Second component | | Ratio of first component/ second component *4 | |
| | Compound *1 | Amount added *2 | Compound *3 | Amount added *2 | Compound *3 | Amount added *2 | | Compound *5 | Amount added *2 | Compound *6 | Amount added *2 | | |
| 69 | (2) | 50 | (17) | 9 | (3) | 9 | 50/50 | (1) | 8 | (1) | 24 | 25/75 | ◎ |
| 70 | (2) | 50 | (17) | 9 | (3) | 9 | 50/50 | (1) | 4.8 | (1) | 27.2 | 20/80 | ◎ |
| 71 | (2) | 50 | (17) | 9 | (3) | 9 | 50/50 | (1) | 3.2 | (1) | 28.8 | 10/90 | ◎ |
| 72 | (2) | 50 | (17) | 9 | (3) | 9 | 50/50 | (1) | 1.6 | (1) | 30.4 | 5/95 | ◎ |
| 73 | (2) | 50 | (17) | 9 | (3) | 9 | 50/50 | (1) | 0 | (1) | 32 | 0/100 | ◎ |
| 74 | (2) | 20 | (17) | 16 | (3) | 16 | 50/50 | (1) | 36 | (1) | 12 | 75/25 | ◎ |
| 75 | (2) | 30 | (17) | 13 | (3) | 13 | 50/50 | (1) | 33 | (1) | 11 | 75/25 | ◎ |

TABLE 15-continued

[Coating Compositions]

| | Resin | | Lubricant | | | | | Rust preventive additive | | | | | |
|---|---|---|---|---|---|---|---|---|---|---|---|---|---|
| | | | First component | | Second component | | Ratio of first component/ | First component | | Second component | | Ratio of first component/ | |
| No. | Compound *1 | Amount added *2 | Compound *3 | Amount added *2 | Compound *3 | Amount added *2 | second component *4 | Compound *5 | Amount added *2 | Compound *6 | Amount added *2 | second component *4 | Dispersion stability |
| 76 | (2) | 40 | (17) | 10 | (3) | 10 | 50/50 | (1) | 30 | (1) | 10 | 75/25 | ◎ |
| 77 | (2) | 70 | (17) | 5 | (3) | 5 | 50/50 | (1) | 15 | (1) | 5 | 75/25 | ◎ |
| 78 | (2) | 80 | (17) | 6 | (3) | 6 | 50/50 | (1) | 6 | (1) | 2 | 75/25 | ◎ |
| 79 | (2) | 90 | (17) | 3 | (3) | 3 | 50/50 | (1) | 3 | (1) | 1 | 75/25 | ◎ |
| 80 | (2) | 58 | (17) | 1 | (3) | 1 | 50/50 | (1) | 30 | (1) | 10 | 75/25 | ◎ |
| 81 | (2) | 57 | (17) | 1.5 | (3) | 1.5 | 50/50 | (1) | 30 | (1) | 10 | 75/25 | ◎ |
| 82 | (2) | 55 | (17) | 2.5 | (3) | 2.5 | 50/50 | (1) | 30 | (1) | 10 | 75/25 | ◎ |
| 83 | (2) | 40 | (17) | 20 | (3) | 20 | 50/50 | (1) | 15 | (1) | 5 | 75/25 | ◎ |
| 84 | (2) | 42 | (17) | 25 | (3) | 25 | 50/50 | (1) | 6 | (1) | 2 | 75/25 | ◎ |
| 85 | (2) | 32 | (17) | 30 | (3) | 30 | 50/50 | (1) | 6 | (1) | 2 | 75/25 | ◎ |

TABLE 16

[Coating Compositions]

| | Resin | | Lubricant | | | | | Rust preventive additive | | | | | |
|---|---|---|---|---|---|---|---|---|---|---|---|---|---|
| | | | First component | | Second component | | Ratio of first | First component | | Second component | | Ratio of first | |
| No. | Compound *1 | Amount added *2 | Compound *3 | Amount added *2 | Compound *3 | Amount added *2 | component/second component *4 | Compound *5 | Amount added *2 | Compound *6 | Amount added *2 | component/second component *4 | Dispersion Stabil |
| 86 | (2) | 70 | (17) | 14 | (3) | 14 | 50/50 | (1) | 1.5 | (1) | 0.5 | 75/25 | ◎ |
| 87 | (2) | 70 | (17) | 13.5 | (3) | 13.5 | 50/50 | (1) | 2.25 | (1) | 0.75 | 75/25 | ◎ |
| 88 | (2) | 70 | (17) | 12.5 | (3) | 12.5 | 50/50 | (1) | 3.75 | (1) | 1.25 | 75/25 | ◎ |
| 89 | (2) | 70 | (17) | 10 | (3) | 10 | 50/50 | (1) | 7.5 | (1) | 2.5 | 75/25 | ◎ |
| 90 | (2) | 62 | (17) | 9 | (3) | 9 | 50/50 | (1) | 15 | (1) | 5 | 75/25 | ◎ |
| 91 | (2) | 50 | (17) | 5 | (3) | 5 | 50/50 | (1) | 30 | (1) | 10 | 75/25 | ◎ |
| 92 | (2) | 40 | (17) | 4 | (2) | 4 | 50/50 | (1) | 39 | (1) | 13 | 75/25 | ◎ |
| 93 | (9) | 50 | (17) | 9 | (3) | 9 | 50/50 | (1) | 16 | (1) | 16 | 50/50 | ◎ |
| 94 | (10) | 50 | (17) | 9 | (3) | 9 | 50/50 | (1) | 16 | (1) | 16 | 50/50 | ◎ |
| 95 | (11) | 50 | (17) | 9 | (3) | 9 | 50/50 | (1) | 16 | (1) | 16 | 50/50 | ◎ |
| 96 | (8) | 50 | (17) | 9 | (3) | 9 | 50/50 | (1) | 16 | (1) | 16 | 50/50 | ◎ |
| 97 | (10) | 50 | (17) | 9 | (3) | 9 | 50/50 | (1) | 32 | (1) | 0 | 100/0 | ◎ |
| 98 | (10) | 50 | (17) | 9 | (3) | 9 | 50/50 | (1) | 28.8 | (1) | 3.2 | 90/10 | ◎ |
| 99 | (10) | 50 | (17) | 9 | (3) | 9 | 50/50 | (1) | 24 | (1) | 8 | 75/25 | ◎ |
| 100 | (10) | 50 | (17) | 9 | (3) | 9 | 50/50 | (1) | 8 | (1) | 24 | 25/75 | ◎ |
| 101 | (10) | 50 | (17) | 9 | (3) | 9 | 50/50 | (1) | 3.2 | (1) | 28.8 | 10/90 | ◎ |
| 102 | (10) | 50 | (17) | 9 | (3) | 9 | 50/50 | (1) | 0 | (1) | 32 | 0/100 | ◎ |

TABLE 18

| | | | Chromate film | | Organic film | | | Rust preventive oil | |
|---|---|---|---|---|---|---|---|---|---|
| No. | Division *1 | Non-plated steel sheet *2 | Method of chromate treatment | Coating amount (mg/m$^2$) *3 | Coating composition *4 | Film thickness ($\mu$m) | Baking temperature (° C.) | Compound *5 | Coating amount (g/m$^2$) |
| 1 | Inv. | (4) | Dried-in-place chromate treatment | 50 | (3) | 1.0 | 140 | (1) | 1.0 |
| 2 | Inv. | (4) | Electrolytic chromate treatment | 50 | (3) | 1.0 | 140 | (1) | 1.0 |
| 3 | Inv. | (4) | Reacted-in-place chromate treatment | 50 | (3) | 1.0 | 140 | (1) | 1.0 |
| 4 | Inv. | (15) | Dried-in-place chromate treatment | 50 | (3) | 1.0 | 140 | (1) | 1.0 |
| 5 | Inv. | (16) | Dried-in-place chromate treatment | 50 | (3) | 1.0 | 140 | (1) | 1.0 |
| 6 | Inv. | (17) | Dried-in-place chromate treatment | 50 | (3) | 1.0 | 140 | (1) | 1.0 |
| 7 | Inv. | (18) | Dried-in-place | 50 | (3) | 1.0 | 140 | (1) | 1.0 |

TABLE 18-continued

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| | | | chromate treatment | | | | | | |
| 8 | Inv. | (19) | Dried-in-place chromate treatment | 50 | (3) | 1.0 | 140 | (1) | 1.0 |
| 9 | Inv. | (20) | Dried-in-place chromate treatment | 50 | (3) | 1.0 | 140 | (1) | 1.0 |
| 10 | Inv. | (21) | Dried-in-place chromate treatment | 50 | (3) | 1.0 | 140 | (1) | 1.0 |
| 11 | Inv. | (22) | Dried-in-place chromate treatment | 50 | (3) | 1.0 | 140 | (1) | 1.0 |
| 12 | Inv. | (23) | Dried-in-place chromate treatment | 50 | (3) | 1.0 | 140 | (1) | 1.0 |
| 13 | Inv. | (1) | Dried-in-place chromate treatment | 50 | (3) | 1.0 | 140 | (1) | 1.0 |
| 14 | Inv. | (2) | Dried-in-place chromate treatment | 50 | (3) | 1.0 | 140 | (1) | 1.0 |
| 15 | Inv. | (3) | Dried-in-place chromate treatment | 50 | (3) | 1.0 | 140 | (1) | 1.0 |
| 16 | Inv. | (5) | Dried-in-place chromate treatment | 50 | (3) | 1.0 | 140 | (1) | 1.0 |
| 17 | Inv. | (6) | Dried-in-place chromate treatment | 50 | (3) | 1.0 | 140 | (1) | 1.0 |

TABLE 19

| No. | Division *1 | Quality characteristics: Press formability Condition 1 | Press formability Condition 2 | Anti-Powdering property | Perforation corrosion resistance | Paint adhesion | Weldability |
|---|---|---|---|---|---|---|---|
| 1 | Inv. | ⊚ | ⊚:2 | ⊚ | ⊚ | ⊚ | ⊚ |
| 2 | Inv. | ⊚ | ⊚ | ⊚ | ○ | ⊚ | ⊚ |
| 3 | Inv. | ⊚ | ⊚ | ⊚ | ○ | ⊚ | ⊚ |
| 4 | Inv. | ⊚ | ⊚ | ⊚ | ○ | ⊚ | ○ |
| 5 | Inv. | ⊚ | ⊚ | ⊚ | ○ | ⊚ | ○~Δ |
| 6 | Inv. | ⊚ | ⊚ | ⊚ | ⊚ | ⊚ | ○~Δ |
| 7 | Inv. | ⊚ | ⊚ | ○~Δ | ⊚~○ | ⊚ | ○~Δ |
| 8 | Inv. | ⊚ | ⊚ | ○~Δ | ⊚~○ | ⊚ | ○~Δ |
| 9 | Inv. | ⊚ | ⊚ | ⊚ | ⊚ | ⊚ | ○~Δ |
| 10 | Inv. | ⊚ | ⊚ | ⊚ | ⊚ | ⊚ | ○~Δ |
| 11 | Inv. | ⊚ | ⊚ | ⊚ | ⊚ | ⊚ | ⊚ |
| 12 | Inv. | ⊚ | ⊚ | ⊚ | ⊚ | ⊚ | ⊚ |
| 13 | Inv. | ⊚ | ⊚;1 | ⊚ | ⊚ | ⊚ | ⊚ |
| 14 | Inv. | ⊚ | ○;1 | ⊚ | ⊚ | ⊚ | ⊚ |
| 15 | Inv. | ⊚ | ⊚;2 | ⊚ | ⊚ | ⊚ | ⊚ |
| 16 | Inv. | ⊚ | ⊚;4 | ⊚ | ⊚ | ⊚ | ⊚ |
| 17 | Inv. | ⊚ | ⊚;4 | ⊚ | ⊚ | ⊚ | ⊚ |

TABLE 20

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oi: Compound *5 | Rust preventive oi: Coating amoun (g/m²) |
|---|---|---|---|---|---|---|---|---|---|
| 18 | Inv. | (7) | Dried-in-place chromate treatment | 50 | (3) | 1.0 | 140 | (1) | 1.0 |
| 19 | Inv. | (8) | Dried-in-place chromate treatment | 50 | (3) | 1.0 | 140 | (1) | 1.0 |
| 20 | Inv. | (9) | Dried-in-place chromate treatment | 50 | (3) | 1.0 | 140 | (1) | 1.0 |
| 21 | Inv. | (10) | Dried-in-place | 50 | (3) | 1.0 | 140 | (1) | 1.0 |

TABLE 20-continued

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oi: Compound *5 | Rust preventive oi: Coating amoun (g/m²) |
|---|---|---|---|---|---|---|---|---|---|
| | | | chromate treatment | | | | | | |
| 22 | Inv. | (11) | Dried-in-place chromate treatment | 50 | (3) | 1.0 | 140 | (1) | 1.0 |
| 23 | Inv. | (12) | Dried-in-place chromate treatment | 50 | (3) | 1.0 | 140 | (1) | 1.0 |
| 24 | Inv. | (13) | Dried-in-place chromate treatemnt | 50 | (3) | 1.0 | 140 | (1) | 1.0 |
| 25 | Inv. | (14) | Dried-in-place chromate treatment | 50 | (3) | 1.0 | 140 | (1) | 1.0 |
| 26 | Comp. | (4) | Dried-in-place chromate treatment | 3 | (3) | 1.0 | 140 | (1) | 1.0 |
| 27 | Inv. | (4) | Dried-in-place chromate treatment | 5 | (3) | 1.0 | 140 | (1) | 1.0 |
| 28 | Inv. | (4) | Dried-in-place chromate treatment | 10 | (3) | 1.0 | 140 | (1) | 1.0 |
| 29 | Inv. | (4) | Dried-in-place chromate treatment | 100 | (3) | 1.0 | 140 | (1) | 1.0 |
| 30 | Inv. | (4) | Dried-in-place chromate treatment | 150 | (3) | 1.0 | 140 | (1) | 1.0 |
| 31 | Inv. | (4) | Dried-in-place chromate treatment | 200 | (3) | 1.0 | 140 | (1) | 1.0 |
| 32 | Comp. | (4) | Dried-in-place chromate treatment | 250 | (3) | 1.0 | 140 | (1) | 1.0 |
| 33 | Comp. | (4) | Dried-in-place chromate treatment | 50 | (3) | 0.04 | 140 | (1) | 1.0 |
| 34 | Inv. | (4) | Dried-in-place chromate treatment | 50 | (3) | 0.1 | 140 | (1) | 1.0 |

TABLE 21

| No. | Division *1 | Quality characteristics: Press formability Condition 1 | Press formability Condition 2 | Anti-Powdering property | Perforation corrosion resistance | Paint adhesion | Weldability |
|---|---|---|---|---|---|---|---|
| 18 | Inv. | ◎ | ◎;5 | ◎ | ◎ | ◎ | ◎ |
| 19 | Inv. | ◎ | ◎;5 | ◎ | ◎ | ◎ | ◎ |
| 20 | Inv. | ◎ | ○;1 | ◎ | ◎ | ◎ | ◎ |
| 21 | Inv. | ◎ | ○;1 | ◎ | ◎ | ◎ | ◎ |
| 22 | Inv. | ○+ | ○~Δ;1 | ◎ | ◎ | ◎ | ◎ |
| 23 | Inv. | ○+ | ○~Δ;1 | ◎ | ◎ | ◎ | ◎ |
| 24 | Inv. | ○+ | ○~Δ;1 | ◎ | ◎ | ◎ | ◎ |
| 25 | Inv. | ○+ | ○~Δ;1 | ◎ | ◎ | ◎ | ◎ |

TABLE 21-continued

| No. | Division *1 | Quality characteristics: Press formability Condition 1 | Press formability Condition 2 | Anti-Powdering property | Perforation corrosion resistance | Paint adhesion | Weldability |
|---|---|---|---|---|---|---|---|
| 26 | Comp. | ◎ | ◎ | ◎ | Δ | ◎ | ◎ |
| 27 | Comp. | ◎ | ◎ | ◎ | ○– | ◎ | ◎ |
| 28 | Inv. | ◎ | ◎ | ◎ | ○ | ◎ | ◎ |
| 29 | Inv. | ◎ | ◎ | ◎ | ◎ | ◎ | ◎ |
| 30 | Inv. | ◎ | ◎ | ◎ | ◎ | ◎ | ◎ |
| 31 | Inv. | ◎ | ◎ | ◎ | ◎ | ◎ | ○ |
| 32 | Comp. | ◎ | ◎ | ◎ | ◎ | ◎ | X |
| 33 | Comp. | X | X | Δ | Δ | ◎ | ◎ |
| 34 | Inv. | ○ | ○~Δ | ○ | ○ | ◎ | ◎ |

TABLE 22

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| 35 | Inv. | (4) | Dried-in-place chromate treatment | 50 | (3) | 0.2 | 140 | (1) | 1.0 |
| 36 | Inv. | (4) | Dried-in-place chromate treatment | 50 | (3) | 0.8 | 140 | (1) | 1.0 |
| 37 | Inv. | (4) | Dried-in-place chromate treatment | 50 | (3) | 1.5 | 140 | (1) | 1.0 |
| 38 | Inv. | (4) | Dried-in-place | 50 | (3) | 2.0 | 140 | (1) | 1.0 |

TABLE 22-continued

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| | | | chromate treatment | | | | | | |
| 39 | Inv. | (4) | Dried-in-place chromate treatment | 50 | (3) | 2.5 | 140 | (1) | 1.0 |
| 40 | Inv. | (4) | Dried-in-place chromate treatment | 50 | (3) | 3.0 | 140 | (1) | 1.0 |
| 41 | Comp. | (4) | Dried-in-place chromate treatment | 50 | (3) | 3.5 | 140 | (1) | 1.0 |
| 42 | Comp. | (4) | Dried-in-place chromate treatment | 50 | (3) | 1.0 | 40 | (1) | 1.0 |
| 43 | Inv. | (4) | Dried-in-place chromate treatment | 50 | (3) | 1.0 | 80 | (1) | 1.0 |
| 44 | Inv. | (4) | Dried-in-place chromate treatment | 50 | (3) | 1.0 | 110 | (1) | 1.0 |
| 45 | Inv. | (4) | Dried-in-place chromate treatment | 50 | (3) | 1.0 | 200 | (1) | 1.0 |
| 46 | Inv. | (4) | Dried-in-place chromate treatment | 50 | (3) | 1.0 | 250 | (1) | 1.0 |
| 47 | Comp. | (4) | Dried-in-place chromate treatment | 50 | (3) | 1.0 | 300 | (1) | 1.0 |
| 48 | Inv. | (4) | Dried-in-place chromate treatment | 50 | (1) | 1.0 | 140 | (1) | 1.0 |
| 49 | Inv. | (4) | Dried-in-place chromate treatment | 50 | (2) | 1.0 | 140 | (1) | 1.0 |
| 50 | Inv. | (4) | Dried-in-place chromate treatment | 50 | (4) | 1.0 | 140 | (1) | 1.0 |
| 51 | Inv. | (4) | Dried-in-place chromate treatment | 50 | (5) | 1.0 | 140 | (1) | 1.0 |

TABLE 23

| No. | Division *1 | Quality characteristics: Press formability: Condition 1 | Press formability: Condition 2 | Anti-powdering property | Perforation corrosion resistance | Paint adhesion | Weldability |
|---|---|---|---|---|---|---|---|
| 35 | Inv. | ○ | ○ | ○ | ◎ | ◎ | ◎ |
| 36 | Inv. | ◎ | ◎ | ◎ | ◎ | ◎ | ◎ |
| 37 | Inv. | ◎ | ◎ | ◎ | ◎ | ◎ | ◎ |
| 38 | Inv. | ◎ | ◎ | ◎ | ◎ | ◎ | ◎ |
| 39 | Inv. | ◎ | ◎ | ◎ | ◎ | ◎ | ◎ |
| 40 | Inv. | ◎ | ◎ | ◎ | ◎ | ◎ | ○ |
| 41 | Comp. | ◎ | ◎ | ◎ | ◎ | ◎ | X |
| 42 | Comp. | ○~Δ | Δ | Δ | X | ◎ | ◎ |
| 43 | Inv. | ◎ | ◎ | ◎ | ○ | ◎ | ◎ |
| 44 | Inv. | ◎ | ◎ | ◎ | ◎ | ◎ | ◎ |
| 45 | Inv. | ◎ | ◎ | ◎ | ◎ | ◎ | ◎ |
| 46 | Inv. | ◎ | ◎ | ◎ | ○ | ◎ | ◎ |
| 47 | Comp. | ◎ | ◎ | ◎~○ | Δ | ◎ | ◎ |
| 48 | Inv. | ○+ | ○ | ◎ | ◎ | ◎ | ◎ |
| 49 | Inv. | ◎ | ○+ | ◎ | ◎ | ◎ | ◎ |
| 50 | Inv. | ◎ | ◎ | ◎ | ◎ | ◎ | ◎ |
| 51 | Inv. | ◎ | ◎ | ◎ | ◎ | ◎ | ◎ |

TABLE 24

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| 52 | Inv. | (4) | Dried-in-place chromate treatment | 50 | (6) | 1.0 | 140 | (1) | 1.0 |
| 53 | Inv. | (4) | Dried-in-place chromate treatment | 50 | (7) | 1.0 | 140 | (1) | 1.0 |

TABLE 24-continued

| No. | Division *1 | Non-plated steel sheet *2 | Chromate film: Method of chromate treatment | Chromate film: Coating amount ($mg/m^2$) *3 | Organic film: Coating composition *4 | Organic film: Film thickness ($\mu m$) | Baking temperature (° C.) | Rust preventive oil: Compound *5 | Rust preventive oil: Coating amount ($g/m^2$) |
|---|---|---|---|---|---|---|---|---|---|
| 54 | Comp. | (4) | Dried-in-place chromate treatment | 50 | (8) | 1.0 | 140 | (1) | 1.0 |
| 55 | Comp. | (4) | Dried-in-place chromate treatment | 50 | (9) | 1.0 | 140 | (1) | 1.0 |
| 56 | Comp. | (4) | Dried-in-place chromate treatment | 50 | (10) | 1.0 | 140 | (1) | 1.0 |
| 57 | Inv. | (4) | Dried-in-place chromate treatment | 50 | (11) | 1.0 | 140 | (1) | 1.0 |
| 58 | Inv. | (4) | Dried-in-place chromate treatment | 50 | (12) | 1.0 | 140 | (1) | 1.0 |
| 59 | Inv. | (4) | Dried-in-place chromate treatment | 50 | (13) | 1.0 | 140 | (1) | 1.0 |
| 60 | Inv. | (4) | Dried-in-place chromate treatment | 50 | (14) | 1.0 | 140 | (1) | 1.0 |
| 61 | Comp. | (4) | Dried-in-place chromate treatment | 50 | (15) | 1.0 | 140 | (1) | 1.0 |
| 62 | Comp. | (4) | Dried-in-place chromate treatment | 50 | (16) | 1.0 | 140 | (1) | 1.0 |
| 63 | Inv. | (4) | Dried-in-place chromate treatment | 50 | (17) | 1.0 | 140 | (1) | 1.0 |
| 64 | Inv. | (4) | Dried-in-place chromate treatment | 50 | (18) | 1.0 | 140 | (1) | 1.0 |
| 65 | Inv. | (4) | Dried-in-place chromate treatment | 50 | (19) | 1.0 | 140 | (1) | 1.0 |
| 66 | Inv. | (4) | Dried-in-place chromate treatment | 50 | (20) | 1.0 | 140 | (1) | 1.0 |
| 67 | Inv. | (4) | Dried-in-place chromate treatment | 50 | (21) | 1.0 | 140 | (1) | 1.0 |
| 68 | Inv. | (4) | Dried-in-place chromate treatment | 50 | (22) | 1.0 | 140 | (1) | 1.0 |

TABLE 25

| No. | Division *1 | Quality characteristics: Press formability Condition 1 | Press formability Condition 2 | Anti-powdering property | Perforation corrosion resistance | Paint adhesion | Weldability |
|---|---|---|---|---|---|---|---|
| 52 | Inv. | ⊚ | ○+ | ⊚ | ⊚ | ⊚ | ⊚ |
| 53 | Inv. | ○+ | ○ | ○ | ⊚ | ⊚ | ⊚ |
| 54 | Comp. | ○ | Δ | ○− | ⊚ | ⊚ | ⊚ |
| 55 | Comp. | ○ | Δ | ○− | ⊚ | ⊚ | ⊚ |
| 56 | Comp. | ○ | Δ | ○− | ⊚ | ⊚ | ⊚ |
| 57 | Inv. | ⊚ | ⊚ | ⊚ | ⊚ | ⊚ | ⊚ |
| 58 | Inv. | ⊚ | ⊚ | ⊚ | ⊚ | ⊚ | ⊚ |
| 59 | Inv. | ⊚ | ⊚ | ⊚ | ⊚ | ⊚ | ⊚ |
| 60 | Inv. | ⊚ | ⊚ | ⊚ | ⊚ | ⊚ | ⊚ |
| 61 | Comp. | Δ | Δ | Δ~X | ⊚ | ⊚ | ⊚ |
| 62 | Comp. | Δ | Δ | Δ~X | ⊚ | ⊚ | ⊚ |
| 63 | Inv. | ⊚ | ⊚ | ⊚ | ⊚ | ⊚ | ⊚ |
| 64 | Inv. | ○ | Δ | ○~Δ | ⊚ | ⊚ | ⊚ |
| 65 | Inv. | ⊚ | ⊚ | ⊚ | ⊚ | ⊚ | ⊚ |
| 66 | Inv. | ⊚ | ⊚ | ⊚ | ⊚ | ⊚ | ⊚ |
| 67 | Inv. | ⊚ | ○ | ⊚ | ⊚ | ⊚ | ⊚ |
| 68 | Inv. | ○ | Δ | ○~Δ | ⊚ | ⊚ | ⊚ |

TABLE 26

| | | | Chromate film | | Organic film | | | | |
|---|---|---|---|---|---|---|---|---|---|
| | | Non-plated | | Coating | Coating | Film | Baking | Rust preventive oil | |
| No. | Division *1 | steel sheet *2 | Method of chromate treatment | amount (mg/m²) *3 | composition *4 | thickness (μm) | temperature (° C.) | Compound *5 | Coating amount (g/m²) |
| 69 | Inv. | (4) | Dried-in-place chromate treatment | 50 | (23) | 1.0 | 140 | (1) | 1.0 |
| 70 | Inv. | (4) | Dried-in-place chromate treatment | 50 | (24) | 1.0 | 140 | (1) | 1.0 |
| 71 | Inv. | (4) | Dried-in-place chromate treatment | 50 | (25) | 1.0 | 140 | (1) | 1.0 |
| 72 | Comp. | (4) | Dried-in-place chromate treatment | 50 | (26) | 1.0 | 140 | (1) | 1.0 |
| 73 | Comp. | (4) | Dried-in-place chromate treatment | 50 | (27) | 1.0 | 140 | (1) | 1.0 |
| 74 | Comp. | (4) | Dried-in-place chromate treatment | 50 | (28) | 1.0 | 140 | (1) | 1.0 |
| 75 | Comp. | (4) | Dried-in-place chromate treatment | 50 | (29) | 1.0 | 140 | (1) | 1.0 |
| 76 | Comp. | (4) | Dried-in-place chromate treatment | 50 | (30) | 1.0 | 140 | (1) | 1.0 |
| 77 | Comp. | (4) | Dried-in-place chromate treatment | 50 | (31) | 1.0 | 140 | (1) | 1.0 |
| 78 | Comp. | (4) | Dried-in-place chromate treatment | 50 | (32) | 1.0 | 140 | (1) | 1.0 |
| 79 | Comp. | (4) | Dried-in-place chromate treatment | 50 | (33) | 1.0 | 140 | (1) | 1.0 |
| 80 | Comp. | (4) | Dried-in-place chromate treatment | 50 | (34) | 1.0 | 140 | (1) | 1.0 |
| 81 | Comp. | (4) | Dried-in-place chromate treatment | 50 | (35) | 1.0 | 140 | (1) | 1.0 |
| 82 | Comp. | (4) | Dried-in-place chromate treatment | 50 | (36) | 1.0 | 140 | (1) | 1.0 |
| 83 | Comp. | (4) | Dried-in-place chromate treatment | 50 | (37) | 1.0 | 140 | (1) | 1.0 |
| 84 | Inv. | (4) | Dried-in-place chromate treatment | 50 | (38) | 1.0 | 140 | (1) | 1.0 |
| 85 | Inv. | (4) | Dried-in-place chromate treatment | 50 | (39) | 1.0 | 140 | (1) | 1.0 |

TABLE 27

| | | Quality characteristics | | | | | |
|---|---|---|---|---|---|---|---|
| | Division | Press formability | | Anti-powdering | Perforation | Paint | |
| No. | *1 | Condition 1 | Condition 2 | property | corrosion resistance | adhesion | Weldability |
| 69 | Inv. | ◎ | ○ | ◎ | ◎ | ◎ | ◎ |
| 70 | Inv. | ◎ | ○ | ◎ | ◎ | ◎ | ◎ |
| 71 | Inv. | ○ | Δ | ○ | ◎ | ◎ | ◎ |
| 72 | Comp. | As being poorly dispersed, the coating composition was difficult to apply onto steel sheets. | | | | | |
| 73 | Comp. | ○ | ○ | ○ | Δ | ◎ | ◎ |
| 74 | Comp. | ○ | Δ | Δ | ◎ | ◎ | ◎ |
| 75 | Comp. | Δ | X | Δ | ◎ | ◎ | ◎ |
| 76 | Comp. | Δ | X | Δ | ◎ | ◎ | ◎ |
| 77 | Comp. | Δ | X | Δ | ◎ | ◎ | ◎ |
| 78 | Comp. | ○ | ○ | ○ | Δ | Δ | ◎ |
| 79 | Comp. | ○ | Δ | Δ | ◎ | ◎ | ◎ |
| 80 | Comp. | Δ | X | Δ | ◎ | ◎ | ◎ |
| 81 | Comp. | Δ | X | Δ | ◎ | ◎ | ◎ |
| 82 | Comp. | Δ | X | Δ | ◎ | ◎ | ◎ |
| 83 | Comp. | Δ | X | Δ | ◎ | ◎ | ◎ |
| 84 | Inv. | ○+ | ○ | ◎ | ◎ | ◎ | ◎ |
| 85 | Inv. | ◎ | ◎ | ◎ | ◎ | ◎ | ◎ |

TABLE 28

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| 86 | Inv. | (4) | Dried-in-place chromate treatment | 50 | (40) | 1.0 | 140 | (1) | 1.0 |
| 87 | Inv. | (4) | Dried-in-place chromate treatment | 50 | (41) | 1.0 | 140 | (1) | 1.0 |
| 88 | Comp. | (4) | Dried-in-place chromate treatment | 50 | (42) | 1.0 | 140 | (1) | 1.0 |
| 89 | Inv. | (4) | Dried-in-place chromate treatment | 50 | (43) | 1.0 | 140 | (1) | 1.0 |
| 90 | Inv. | (4) | Dried-in-place chromate treatment | 50 | (44) | 1.0 | 140 | (1) | 1.0 |
| 91 | Inv. | (4) | Dried-in-place chromate treatment | 50 | (45) | 1.0 | 140 | (1) | 1.0 |
| 92 | Comp. | (4) | Dried-in-place chromate treatment | 50 | (46) | 1.0 | 140 | (1) | 1.0 |
| 93 | Comp. | (4) | Dried-in-place chromate treatment | 50 | (47) | 1.0 | 140 | (1) | 1.0 |
| 94 | Inv. | (4) | Dried-in-place chromate treatment | 50 | (48) | 1.0 | 140 | (1) | 1.0 |
| 95 | Inv. | (4) | Dried-in-place chromate treatment | 50 | (49) | 1.0 | 140 | (1) | 1.0 |
| 96 | Comp. | (4) | Dried-in-place chromate treatment | 50 | (50) | 1.0 | 140 | (1) | 1.0 |
| 97 | Inv. | (4) | Dried-in-place chromate treatment | 50 | (51) | 1.0 | 140 | (1) | 1.0 |
| 98 | Inv. | (4) | Dried-in-place chromate treatment | 50 | (52) | 1.0 | 140 | (1) | 1.0 |
| 99 | Inv. | (4) | Dried-in-place chromate treatment | 50 | (53) | 1.0 | 140 | (1) | 1.0 |
| 100 | Inv. | (4) | Dried-in-place chromate treatment | 50 | (54) | 1.0 | 140 | (1) | 1.0 |
| 101 | Inv. | (4) | Dried-in-place chromate treatment | 50 | (55) | 1.0 | 140 | (1) | 1.0 |
| 102 | Inv. | (4) | Dried-in-place chromate treatment | 50 | (56) | 1.0 | 140 | (1) | 1.0 |

TABLE 29

| No. | Division *1 | Quality characteristics: Press formability Condition 1 | Press formability Condition 2 | Anti-powdering property | Perforation corrosion resistance | Paint adhesion | Weldability |
|---|---|---|---|---|---|---|---|
| 86 | Inv. | ⊚ | ⊚ | ⊚ | ⊚ | ⊚ | ⊚ |
| 87 | Inv. | ⊚ | ⊚ | ○ | ⊚ | ⊚ | ⊚ |
| 88 | Comp. | Δ | Δ | Δ | ⊚ | ⊚ | ⊚ |
| 89 | Inv. | ⊚ | ⊚ | ⊚ | ○ | ○ | ⊚ |
| 90 | Inv. | ⊚ | ⊚ | ⊚ | ⊚ | ⊚ | ⊚ |
| 91 | Inv. | ⊚ | ⊚ | ⊚ | ⊚ | ○ | ⊚ |
| 92 | Comp. | ⊚ | ⊚ | ⊚ | Δ | Δ | ⊚ |
| 93 | Comp. | ⊚ | ⊚ | ⊚ | ⊚ | X | ⊚ |
| 94 | Inv. | ⊚ | ⊚ | ⊚ | ○ | ○ | ⊚ |
| 95 | Inv. | ⊚ | ⊚ | ⊚ | ⊚ | ⊚ | ⊚ |
| 96 | Comp. | ⊚ | ⊚ | ⊚ | Δ | Δ | ⊚ |
| 97 | Inv. | ⊚ | ⊚ | ⊚ | ⊚ | ⊚ | ⊚ |
| 98 | Inv. | ⊚ | ⊚ | ⊚ | ⊚ | ⊚ | ⊚ |
| 99 | Inv. | ⊚ | ⊚ | ⊚ | ⊚ | ⊚ | ⊚ |
| 100 | Inv. | ⊚ | ⊚ | ⊚ | ⊚~○ | ⊚ | ⊚ |
| 101 | Inv. | ⊚ | ⊚ | ⊚ | ⊚~○ | ⊚ | ⊚ |
| 102 | Inv. | ⊚ | ⊚ | ⊚ | ⊚~○ | ⊚ | ⊚ |

TABLE 30

| No. | Division *1 | Non-plated steel sheet *2 | Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| 103 | Inv. | (4) | Dried-in-place chromate treatment | 50 | (57) | 1.0 | 140 | (1) | 1.0 |
| 104 | Inv. | (4) | Dried-in-place chromate treatment | 50 | (58) | 1.0 | 140 | (1) | 1.0 |
| 105 | Inv. | (4) | Dried-in-place chromate treatment | 50 | (59) | 1.0 | 140 | (1) | 1.0 |
| 106 | Inv. | (4) | Dried-in-place chromate treatment | 50 | (60) | 1.0 | 140 | (1) | 1.0 |
| 107 | Inv. | (4) | Dried-in-place chromate treatment | 50 | (61) | 1.0 | 140 | (1) | 1.0 |
| 108 | Inv. | (4) | Dried-in-place chromate treatment | 50 | (62) | 1.0 | 140 | (1) | 1.0 |
| 109 | Inv. | (4) | Dried-in-place chromate treatment | 50 | (63) | 1.0 | 140 | (1) | 1.0 |
| 110 | Inv. | (4) | Dried-in-place chromate treatment | 50 | (64) | 1.0 | 140 | (1) | 1.0 |
| 111 | Inv. | (4) | Dried-in-place chromate treatment | 50 | (65) | 1.0 | 140 | (1) | 1.0 |
| 112 | Inv. | (4) | Dried-in-place chromate treatment | 50 | (66) | 1.0 | 140 | (1) | 1.0 |
| 113 | Inv. | (4) | Dried-in-place chromate treatment | 50 | (67) | 1.0 | 140 | (1) | 1.0 |
| 114 | Inv. | (4) | Dried-in-place chromate treatment | 50 | (68) | 1.0 | 140 | (1) | 1.0 |
| 115 | Inv. | (4) | Dried-in-place chromate treatment | 50 | (69) | 1.0 | 140 | (1) | 1.0 |
| 116 | Inv. | (4) | Dried-in-place chromate treatment | 50 | (70) | 1.0 | 140 | (1) | 1.0 |
| 111 | Inv. | (4) | Dried-in-place chromate treatment | 50 | (71) | 1.0 | 140 | (1) | 1.0 |
| 118 | Inv. | (4) | Dried-in-place chromate treatment | 50 | (72) | 1.0 | 140 | (1) | 1.0 |
| 119 | Inv. | (4) | Dried-in-place chromate treatment | 50 | (73) | 1.0 | 140 | (1) | 1.0 |

TABLE 31

| No. | Division *1 | Quality characteristics: Press formability Condition 1 | Press formability Condition 2 | Anti-powdering property | Perforation corrosion resistance | Paint adhesion | Weldability |
|---|---|---|---|---|---|---|---|
| 103 | Inv. | ◎ | ◎ | ◎ | ◎~○ | ◎ | ◎ |
| 104 | Inv. | ◎ | ◎ | ◎ | ◎~○ | ◎ | ◎ |
| 105 | Inv. | ◎ | ◎ | ◎ | ◎~○ | ◎ | ◎ |
| 106 | Inv. | ◎ | ◎ | ◎ | ◎ | ◎ | ◎ |
| 107 | Inv. | ◎ | ◎ | ◎ | ◎ | ◎ | ◎ |
| 108 | Inv. | ◎ | ◎ | ◎ | ◎ | ◎ | ◎ |
| 109 | Inv. | ◎ | ◎ | ◎ | ◎ | ◎ | ◎ |
| 110 | Inv. | ◎ | ◎ | ◎ | ○- | ◎ | ◎ |
| 111 | Inv. | ◎ | ◎ | ◎ | ○ | ◎ | ◎ |
| 112 | Inv. | ◎ | ◎ | ◎ | ◎ | ◎ | ◎ |
| 113 | Inv. | ◎ | ◎ | ◎ | ◎ | ◎ | ◎ |
| 114 | Inv. | ◎ | ◎ | ◎ | ◎ | ◎ | ◎ |
| 115 | Inv. | ◎ | ◎ | ◎ | ◎ | ◎ | ◎ |
| 116 | Inv. | ◎ | ◎ | ◎ | ◎ | ◎ | ◎ |
| 117 | Inv. | ◎ | ◎ | ◎ | ◎ | ◎ | ◎ |
| 118 | Inv. | ◎ | ◎ | ◎ | ○ | ◎ | ◎ |
| 119 | Inv. | ◎ | ◎ | ◎ | ○- | ◎ | ◎ |

TABLE 32

| No. | Division *1 | Non-plated steel sheet *2 | Chromate film: Method of chromate treatment | Chromate film: Coating amount ($mg/m^2$) *3 | Organic film: Coating composition *4 | Organic film: Film thickness ($\mu m$) | Baking temperature (° C.) | Rust preventive oil: Compound *5 | Rust preventive oil: Coating amount ($g/m^2$) |
|---|---|---|---|---|---|---|---|---|---|
| 120 | Comp. | (4) | Dried-in-place chromate treatment | 50 | (74) | 1.0 | 140 | (1) | 1.0 |
| 121 | Inv. | (4) | Dried-in-place chromate treatment | 50 | (75) | 1.0 | 140 | (1) | 1.0 |
| 122 | Inv. | (4) | Dried-in-place chromate treatment | 50 | (76) | 1.0 | 140 | (1) | 1.0 |
| 123 | Inv. | (4) | Dried-in-place chromate treatment | 50 | (77) | 1.0 | 140 | (1) | 1.0 |
| 124 | Inv. | (4) | Dried-in-place chromate treatment | 50 | (78) | 1.0 | 140 | (1) | 1.0 |
| 125 | Comp. | (4) | Dried-in-place chromate treatment | 50 | (79) | 1.0 | 140 | (1) | 1.0 |
| 126 | Comp. | (4) | Dried-in-place chromate treatment | 50 | (80) | 1.0 | 140 | (1) | 1.0 |
| 127 | Inv. | (4) | Dried-in-place chromate treatment | 50 | (81) | 1.0 | 140 | (1) | 1.0 |
| 128 | Inv. | (4) | Dried-in-place chromate treatment | 50 | (82) | 1.0 | 140 | (1) | 1.0 |
| 129 | Inv. | (4) | Dried-in-place chromate treatment | 50 | (83) | 1.0 | 140 | (1) | 1.0 |
| 130 | Inv. | (4) | Dried-in-place chromate treatment | 50 | (84) | 1.0 | 140 | (1) | 1.0 |
| 131 | Comp. | (4) | Dried-in-place chromate treatment | 50 | (85) | 1.0 | 140 | (1) | 1.0 |
| 132 | Comp. | (4) | Dried-in-place chromate treatment | 50 | (86) | 1.0 | 140 | (1) | 1.0 |
| 133 | Inv. | (4) | Dried-in-place chromate treatment | 50 | (87) | 1.0 | 140 | (1) | 1.0 |
| 134 | Inv. | (4) | Dried-in-place chromate treatment | 50 | (88) | 1.0 | 140 | (1) | 1.0 |
| 135 | Inv. | (4) | Dried-in-place chromate treatment | 50 | (89) | 1.0 | 140 | (1) | 1.0 |
| 136 | Inv. | (4) | Dried-in-place chromate treatment | 50 | (90) | 1.0 | 140 | (1) | 1.0 |

TABLE 33

| No. | Division *1 | Quality characteristics: Press formability Condition 1 | Press formability Condition 2 | Anti-powdering property | Perforation corrosion resistance | Paint adhesion | Weldability |
|---|---|---|---|---|---|---|---|
| 120 | Comp. | ○ | Δ | Δ | Δ | ◎ | ◎ |
| 121 | Inv. | ○+ | ○ | ○ | ○ | ◎ | ◎ |
| 122 | Inv. | ◎ | ◎ | ◎ | ◎ | ◎ | ◎ |
| 123 | Inv. | ◎ | ◎ | ◎ | ◎ | ◎ | ◎ |
| 124 | Inv. | ◎ | ◎ | ◎ | ◎ | ◎ | ◎ |
| 125 | Comp. | ◎ | ◎ | ◎ | Δ | ◎ | ◎ |
| 126 | Comp. | Δ | Δ | Δ | ◎ | ◎ | ◎ |
| 127 | Inv. | ○+ | ○ | ○ | ◎ | ◎ | ◎ |
| 128 | Inv. | ◎ | ◎ | ◎ | ◎ | ◎ | ◎ |
| 129 | Inv. | ◎ | ◎ | ◎ | ◎ | ◎ | ◎ |
| 130 | Inv. | ◎ | ◎ | ◎ | ◎ | ○ | ◎ |
| 131 | Comp. | ○+ | ○ | Δ | ◎ | X | ◎ |
| 132 | Comp. | ◎ | ◎ | ◎ | Δ | ◎ | ◎ |
| 133 | Inv. | ◎ | ◎ | ◎ | ○ | ◎ | ◎ |
| 134 | Inv. | ◎ | ◎ | ◎ | ○ | ◎ | ◎ |
| 135 | Inv. | ◎ | ◎ | ◎ | ◎ | ◎ | ◎ |
| 136 | Inv. | ◎ | ◎ | ◎ | ◎ | ◎ | ◎ |

TABLE 34

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| 137 | Inv. | (4) | Dried-in-place chromate treatment | 50 | (91) | 1.0 | 140 | (1) | 1.0 |
| 138 | Comp. | (4) | Dried-in-place chromate treatment | 50 | (92) | 1.0 | 140 | (1) | 1.0 |
| 139 | Inv. | (4) | Dried-in-place chromate treatment | 50 | (3) | 1.0 | 140 | (2) | 1.0 |
| 140 | Inv. | (4) | Dried-in-place chromate treatment | 50 | (3) | 1.0 | 140 | (3) | 1.0 |
| 141 | Inv. | (4) | Dried-in-place chromate treatment | 50 | (3) | 1.0 | 140 | (4) | 1.0 |
| 142 | Inv. | (4) | Dried-in-place chromate treatment | 50 | (3) | 1.0 | 140 | (5) | 1.0 |
| 143 | Inv. | (4) | Dried-in-place chromate treatment | 50 | (3) | 1.0 | 140 | (6) | 1.0 |
| 144 | Inv. | (4) | Dried-in-place chromate treatment | 50 | (3) | 1.0 | 140 | (7) | 1.0 |
| 145 | Inv. | (4) | Dried-in-place chromate treatment | 50 | (3) | 1.0 | 140 | (8) | 1.0 |
| 146 | Inv. | (4) | Dried-in-place chromate treatment | 50 | (3) | 1.0 | 140 | (1) | 0.005 |
| 147 | Inv. | (4) | Dried-in-place chromate treatment | 50 | (3) | 1.0 | 140 | (1) | 0.01 |
| 148 | Inv. | (4) | Dried-in-pace chromate treatment | 50 | (3) | 1.0 | 140 | (1) | 0.05 |
| 149 | Inv. | (4) | Dried-in-place chromate treatment | 50 | (3) | 1.0 | 140 | (1) | 5.0 |
| 150 | Inv. | (4) | Dried-in-place chromate treatment | 50 | (3) | 1.0 | 140 | (1) | 10.0 |
| 151 | Comp. | (4) | Dried-in-place chromate treatment | 50 | (3) | 1.0 | 140 | (1) | 15.0 |

TABLE 35

| No. | Division *1 | Quality characteristics: Press formability Condition 1 | Press formability Condition 2 | Anti-powdering property | Perforation corrosion resistance | Paint adhesion | Weldability |
|---|---|---|---|---|---|---|---|
| 137 | Inv. | ◎ | ◎ | ◎ | ◎ | ◎ | ◎ |
| 138 | Comp. | Δ | Δ | Δ | ○ | ◎ | ◎ |
| 139 | Inv. | ◎ | ◎ | ◎ | ◎ | ◎ | ◎ |
| 140 | Inv. | ◎ | ◎ | ◎ | ◎ | ◎ | ◎ |
| 141 | Inv. | ◎ | ◎ | ◎ | ◎ | ◎ | ◎ |
| 142 | Inv. | ◎ | ◎ | ◎ | ◎ | ◎ | ◎ |
| 143 | Inv. | ◎ | ◎ | ◎ | ◎ | ◎ | ◎ |
| 144 | Inv. | ◎ | ◎ | ◎ | ◎ | ◎ | ◎ |
| 145 | Inv. | ◎ | ◎ | ◎ | ◎ | ◎ | ◎ |
| 146 | Inv. | ○+ | ○ | ○− | ◎ | ◎ | ◎ |
| 147 | Inv. | ◎ | ○+ | ○ | ◎ | ◎ | ◎ |
| 148 | Inv. | ◎ | ◎ | ◎ | ◎ | ◎ | ◎ |
| 149 | Inv. | ◎ | ◎ | ◎ | ◎ | ◎ | ◎ |
| 150 | Inv. | ◎ | ◎ | ◎ | ◎ | ○ | ◎ |
| 151 | Comp. | Degreasing was difficult in the pre-treatment prior to coating. | | | | | |

TABLE 36

| No. | Division *1 | Non-plated steel sheet *2 | Chromate film: Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| 114 | Inv. | (4) | Dried-in-place chromate treatment | 50 | (68) | 1.0 | 140 | (1) | 1.0 |
| 152 | Inv. | (4) | Dried-in-place | 50 | (93) | 1.0 | 140 | (1) | 1.0 |

TABLE 36-continued

| No. | Division *1 | Non-plated steel sheet *2 | Method of chromate treatment | Chromate film: Coating amount (mg/m²) *3 | Organic film: Coating composition *4 | Organic film: Film thickness (μm) | Baking temperature (° C.) | Rust preventive oil: Compound *5 | Rust preventive oil: Coating amount (g/m²) |
|---|---|---|---|---|---|---|---|---|---|
| | | | chromate treatment | | | | | | |
| 153 | Inv. | (4) | Dried-in-place chromate treatment | 50 | (94) | 1.0 | 140 | (1) | 1.0 |
| 154 | Inv. | (4) | Dried-in-place chromate treatment | 50 | (95) | 1.0 | 140 | (1) | 1.0 |
| 155 | Inv. | (4) | Dried-in-place chromate treatment | 50 | (96) | 1.0 | 140 | (1) | 1.0 |
| 156 | Inv. | (4) | Dried-in-place chromate treatment | 50 | (97) | 1.0 | 140 | (1) | 1.0 |
| 157 | Inv. | (4) | Dried-in-place chromate treatment | 50 | (98) | 1.0 | 140 | (1) | 1.0 |
| 158 | Inv. | (4) | Dried-in-place chromate treatment | 50 | (99) | 1.0 | 140 | (1) | 1.0 |
| 159 | Inv. | (4) | Dried-in-place chromate treatment | 50 | (100) | 1.0 | 140 | (1) | 1.0 |
| 160 | Inv. | (4) | Dried-in-place chromate treatment | 50 | (101) | 1.0 | 140 | (1) | 1.0 |
| 161 | Inv. | (4) | Dried-in-place chromate treatment | 50 | (102) | 1.0 | 140 | (1) | 1.0 |

TABLE 37

| No. | Division *1 | Quality characteristics: Press formability Condition 1 | Press formability Condition 2 | Anti-powdering property | Perforation corrosion resistance | Paint adhesion | Weldability | Corrosion resistance in rust-contaminated environment Condition 1 | Corrosion resistance in rust-contaminated environment Condition 2 |
|---|---|---|---|---|---|---|---|---|---|
| 114 | Inv. | ◎ | ◎ | ◎ | ◎ | ◎ | ◎ | ○ | ○− |
| 152 | Inv. | ◎ | ◎ | ◎ | ◎ | ◎ | ◎ | ○+ | ○ |
| 153 | Inv. | ◎ | ◎ | ◎ | ◎ | ◎ | ◎ | ◎ | ◎ |
| 154 | Inv. | ◎ | ◎ | ◎ | ◎ | ◎ | ◎ | Δ | X |
| 155 | Inv. | ◎ | ◎ | ◎ | ◎ | ◎ | ◎ | ◎ | ○+ |
| 156 | Inv. | ◎ | ◎ | ◎ | ○− | ◎ | ◎ | ○ | Δ |
| 157 | Inv. | ◎ | ◎ | ◎ | ◎ | ◎ | ◎ | ○+ | ○−~Δ |
| 158 | Inv. | ◎ | ◎ | ◎ | ◎ | ◎ | ◎ | ◎ | ○ |
| 159 | Inv. | ◎ | ◎ | ◎ | ◎ | ◎ | ◎ | ◎ | ◎ |
| 160 | Inv. | ◎ | ◎ | ◎ | ◎ | ◎ | ◎ | ◎ | ◎ |
| 161 | Inv. | ◎ | ◎ | ◎ | ○− | ◎ | ◎ | ◎ | ◎ |

INDUSTRIAL APPLICABILITY

The organic composite coated steel sheet of the present invention has good press formability, high perforation corrosion resistance and high corrosion resistance in a rust-contaminated environment, while having other various good characteristics including good paint adhesion and good weldability. Therefore, it is useful as a surface-treated steel sheet for automobile bodies, electric appliances and buildings.

We claim:

1. An organic composite coated steel sheet with press formability and perforation corrosion resistance, which comprises a zinc or zinc alloy plated steel sheet having on at least one of its surfaces a first chromate layer having a coating weight of from 5 to 200 mg/m$^2$ in terms of metallic chromium, and a second layer of an organic film having a thickness of from 0.1 to 3.0 $\mu$m, in that order, and in which said organic film comprises an epoxy resin mixture (i), a lubricant (ii) and a rust preventive additive, in such a ratio by weight, in terms of the non-volatile contents, that the epoxy resin mixture is from 30 to 80% by weight, the lubricant is from 8 to 50% by weight and the rust preventive additive is from 3 to 50% by weight; wherein (i) is an epoxy resin mixture composed of a base resin (A) as prepared by adding at least one basic nitrogen atom and at least two primary hydroxyl groups to the ends of an epoxy resin, and a curing agent for (A) of a polyisocyanate compound (B), as mixed in a ratio by weight, A/B, of being from 95/5 to 55/45 (in terms of the non-volatile contents); and (ii) is a composite lubricant composed of a polyethylene wax (C) having a molecular weight of from 700 to 4500 and a softening point of from 100 to 140° C. as prepared through coordination-anionic polymerization using a Ziegler catalyst, and a powder of a fluorine resin (D), as mixed in a ratio by weight, C/D, of being from 10/90 to 90/10, wherein said fluorine resin (D) to be in the organic film is a powder of a tetrafluoroethylene resin having a mean particle size of from 0.1 to 5 $\mu$m that satisfies the following conditions (a) and (b):

(a) When tested in a method for testing its flow properties with a capillary rheometer under the conditions mentioned below, in accordance with JIS K7199, the apparent melt viscosity and the apparent rate of shear of the resin powder satisfy the following equation (1):

$$\log \eta \leqq A - B \log \gamma \tag{1}$$

in which:

A is 5.45;

B is 0.64;

η is the apparent melt viscosity (poise) of the resin, provided that η>0; and

γ is the apparent rate of shear of the resin ($sec^{-1}$), provided that $5 \leqq \gamma \leqq 1300$, Test Conditions:

Temperature: 330° C.

Diameter of Barrel: 9.55 mm

Dimension of Capillary:

Diameter, d=1 mm

Length, 1=10 mm

Inlet of Capillary: flat (b) The resin has a specific surface area of 11 $m^2/g$ or smaller.

2. The organic composite coated steel sheet with press formability and perforation corrosion resistance as claimed in claim 1; wherein the resin has a specific surface area of 6 $m^2/g$ or smaller.

3. The organic composite coated steel sheet with press formability and perforation corrosion resistance as claimed in claim 1 or 2; wherein said polyethylene wax (C) to be in the organic film is a polyethylene wax having a molecular weight of from 1000 to 3500 and a softening point of from 110 to 130° C.

4. The organic composite coated steel sheet with press formability, perforation corrosion resistance and corrosion resistance in a rust-contaminated environment as claimed in claim 1 or 2; wherein the polyisocyanate compound (B) to be in the organic film is a polyfunctional polyisocyanate compound having at least three isocyanato groups in one molecule.

5. The organic composite coated steel sheet with press formability, perforation corrosion resistance and corrosion resistance in a rust-contaminated environment as claimed in claim 1 or 2; wherein the polyisocyanate compound (B) to be in the organic film is a polyfunctional polyisocyanate compound having at least four isocyanato groups in one molecule.

6. The organic composite coated steel sheet with press formability, perforation corrosion resistance and corrosion resistance in a rust-contaminated environment as claimed in claim 1 or 2; wherein the polyisocyanate compound (B) to be in the organic film is a polyfunctional polyisocyanate compound having at least six isocyanato groups in one molecule.

7. The organic composite coated steel sheet with press formability, perforation corrosion resistance and corrosion resistance in a rust-contaminated environment as claimed in claim 1 or 2; wherein the polyisocyanate compound (B) to be in the organic film is a polyfunctional hexamethylene diisocyanate having at least six isocyanato groups in one molecule.

8. The organic composite coated steel sheet with press formability and perforation corrosion resistance as claimed in claim 1 or 2; wherein the rust preventive additive to be in the organic film is at least one selected from the group consisting of silica and sparingly soluble chromates.

9. The organic composite coated steel sheet with press formability and perforation corrosion resistance as claimed in claim 1 or 2; wherein the rust preventive additive to be in the organic film comprises silica and a sparingly soluble chromate in a ratio by weight, silica/sparingly soluble chromate, of from 90/10 to 10/90.

10. The organic composite coated steel sheet with press formability, perforation corrosion resistance and corrosion resistance in a rust-contaminated environment as claimed in claim 1 or 2; wherein the polyethylene wax (C) to be in the organic film is a polyethylene wax having a molecular weight of from 1000 to 3500 and a softening point of from 110 to 130° C., and the polyisocyanate compound (B) to be in the same is a polyfunctional polyisocyanate compound having at least three isocyanate groups in one molecule.

11. The organic composite coated steel sheet with press formability, perforation corrosion resistance and corrosion resistance in a rust-contaminated environment as claimed in claim 10; wherein the polyisocyanate compound (B) to be in the organic film is a polyfunctional polyisocyanate compound having at least four isocyanato groups in one molecule.

12. The organic composite coated steel sheet with press formability, perforation corrosion resistance and corrosion resistance in a rust-contaminated environment as claimed in claim 10; wherein the polyisocyanate compound (B) to be in the organic film is a polyfunctional polyisocyanate compound having at least six isocyanato groups in one molecule.

13. The organic composite coated steel sheet with press formability, perforation corrosion resistance and corrosion resistance in a rust-contaminated environment as claimed in claim 10; wherein the polyisocyanate compound (B) to be in the organic film is a polyfunctional hexamethylene diisocyanate having at least six isocyanato groups in one molecule.

14. The organic composite coated steel sheet with press formability, perforation corrosion resistance and corrosion resistance in a rust-contaminated environment as claimed in claim 10; wherein the rust preventive additive to be in the organic film is at least one selected from the group consisting of silica and sparingly soluble chromates.

15. The organic composite coated steel sheet with press formability, perforation corrosion resistance and corrosion resistance in a rust-contaminated environment as claimed in claim 10; wherein the rust preventive additive to be in the organic film comprises silica and a sparingly soluble chromate in a ratio by weight, silica/sparingly soluble chromate, of from 90/10 to 10/90.

16. An organic composite coated steel sheet with press formability and perforation corrosion resistance, which comprises a zinc or zinc alloy plated steel sheet having on at least one of its surfaces a first chromate layer having a coating weight of from 5 to 200 $mg/m^2$ in terms of metallic chromium, and a second layer of an organic film having a thickness of from 0.1 to 3.0 μm, in that order, and in which said organic film comprises an epoxy resin mixture (i), a lubricant (ii) and a rust preventive additive, in such a ratio by weight, in terms of the non-volatile contents, that the epoxy resin mixture is from 30 to 80% by weight, the lubricant is from 3 to 50% by weight and the rust preventive additive is from 3 to 50% by weight; wherein (i) is an epoxy resin mixture composed of a base resin (A) as prepared by adding at least one basic nitrogen atom and at least two primary hydroxyl groups to the ends of an epoxy resin, and a curing agent for (A) of a polyisocyanate compound (B), as mixed in a ratio by weight, A/B, of being from 95/5 to 55/45 (in terms of the non-volatile contents); and (ii) is a particulate composite lubricant (E) comprising both a polyethylene (C') having a molecular weight of from 700 to 4500 and a softening point of from 100 to 140° C. as prepared through coordination-anionic polymerization using a Ziegler catalyst and a fluorine resin (D') in one particle; or a composite lubricant comprising said particulate lubricant (E), and a polyethylene wax (C) having a molecular weight of from 700 to 4500 and a softening point of from 100 to 140° C. as prepared through coordination-anionic polymerization using a Ziegler catalyst and/or powder of a fluorine resin (D), in which the ratio by weight of said polyethylene wax (C) and said polyethylene (C') to said powdery fluorine resin (D) and said fluorine resin (D'), (C+C')/(D+D'), is from 10/90 to 90/10, and wherein said fluorine resin (D') constituting said lubricant (E) and said powdery fluorine resin (D), both being in the organic film, are a tetrafluoroethylene resin or a powder of a tetrafluoroethylene resin having a mean particle size of from 0.1 to 5 μm that satisfies the following conditions (a) and (b):

(a) When tested in a method for testing its flow properties with a capillary rheometer under the conditions mentioned below, in accordance with JIS K7199, the apparent melt viscosity and the apparent rate of shear of the resin powder satisfy the following equation (1):

$$\log \eta \leqq A - B \log \gamma \quad (1)$$

in which:

A is 5.45;

B is 0.64;

η is the apparent melt viscosity (poise) of the resin, provided that η>0; and

γ is the apparent rate of shear of the resin ($sec^{-1}$), provided that $5 \leqq \gamma \leqq 1300$, Test Conditions:

Temperature: 330° C.

Diameter of Barrel: 9.55 mm

Dimension of Capillary:

Diameter, d=1 mm

Length, 1=10 mm

Inlet of Capillary: flat (b) The resin has a specific surface area of 11 $m^2$/g or smaller.

17. The organic composite coated steel sheet with press formability and perforation corrosion resistance as claimed in claim 16; wherein said fluorine resin has a specific surface area of 6 $m^2$/g or smaller.

18. The organic composite coated steel sheet with press formability and perforation corrosion resistance as claimed in claim 16 or 17; wherein said polyethylene (C') constituting said lubricant (E) and said polyethylene wax (C), both being in the organic film, are a polyethylene or a polyethylene wax having a molecular weight of from 1000 to 3500 and a softening point of from 110 to 130° C.

19. The organic composite coated steel sheet with press formability, perforation corrosion resistance and corrosion resistance in a rust-contaminated environment as claimed in claim 16 or 17; wherein the polyisocyanate compound (B) to be in the organic film is a polyfunctional polyisocyanate compound having at least three isocyanato groups in one molecule.

20. The organic composite coated steel sheet with press formability, perforation corrosion resistance and corrosion resistance in a rust-contaminated environment as claimed in claim 16 or 17; wherein the polyisocyanate compound (B) to be in the organic film is a polyfunctional polyisocyanate compound having at least four isocyanato groups in one molecule.

21. The organic composite coated steel sheet with press formability, perforation corrosion resistance and corrosion resistance in a rust-contaminated environment as claimed in claim 16 or 17; wherein the polyisocyanate compound (B) to be in the organic film is a polyfunctional polyisocyanate compound having at least six isocyanato groups in one molecule.

22. The organic composite coated steel sheet with press formability, perforation corrosion resistance and corrosion resistance in a rust-contaminated environment as claimed in claim 16 or 17; wherein the polyisocyanate compound (B) to be in the organic film is a polyfunctional hexamethylene diisocyanate having at least six isocyanato groups in one molecule.

23. The organic composite coated steel sheet with press formability and perforation corrosion resistance as claimed in claim 16 or 17; wherein the rust preventive additive to be in the organic film is at least one selected from the group consisting of silica and sparingly soluble chromates.

24. The organic composite coated steel sheet with press formability and perforation corrosion resistance as claimed in claim 16 or 17; wherein the rust preventive additive to be in the organic film comprises silica and a sparingly soluble chromate in a ratio by weight, silica/sparingly soluble chromate, of from 90/10 to 10/90.

25. The organic composite coated steel sheet with press formability, perforation corrosion resistance and corrosion resistance in a rust-contaminated environment as claimed in claim 16 or 17; wherein said polyethylene (C') constituting said lubricant (E) and said polyethylene wax (C), both being in the organic film, are a polyethylene or a polyethylene wax having a molecular weight of from 1000 to 3500 and a softening point of from 110 to 130° C., and the polyisocyanate compound (B) to be in the same is a polyfunctional polyisocyanate compound having at least three isocyanate groups in one molecule.

26. The organic composite coated steel sheet with press formability, perforation corrosion resistance and corrosion resistance in a rust-contaminated environment as claimed in claim 25; wherein the polyisocyanate compound (B) to be in the organic film is a polyfunctional polyisocyanate compound having at least four isocyanato groups in one molecule.

27. The organic composite coated steel sheet with press formability, perforation corrosion resistance and corrosion resistance in a rust-contaminated environment as claimed in claim 25; wherein the polyisocyanate compound (B) to be in the organic film is a polyfunctional polyisocyanate compound having at least six isocyanato groups in one molecule.

28. The organic composite coated steel sheet with press formability, perforation corrosion resistance and corrosion resistance in a rust-contaminated environment as claimed in claim 25; wherein the polyisocyanate compound (B) to be in the organic film is a polyfunctional hexamethylene diisocyanate having at least six isocyanato groups in one molecule.

29. The organic composite coated steel sheet with press formability, perforation corrosion resistance and corrosion resistance in a rust-contaminated environment as claimed in claim 25; wherein the rust preventive additive to be in the organic film is at least one selected from the group consisting of silica and sparingly soluble chromates.

30. The organic composite coated steel sheet with press formability, perforation corrosion resistance and corrosion resistance in a rust-contaminated environment as claimed in claim 25; wherein the rust preventive additive to be in the organic film comprises silica and a sparingly soluble chromate in a ratio by weight, silica/sparingly soluble chromate, of from 90/10 to 10/90.

31. The organic composite coated steel sheet as claimed in claim 1, 2, 16 or 17, which has, over the organic film, a third layer of rust preventive oil having a coating weight of from 0.01 to 10 $g/m^2$.

32. The organic composite coated steel sheet as claimed in claim 3, which has, over the organic film, a third layer of rust preventive oil having a coating weight of from 0.01 to 10 $g/m^2$.

33. The organic composite coated steel sheet as claimed in claim 18, which has, over the organic film, a third layer of rust preventive oil having a coating weight of from 0.01 to 10 $g/m^2$.

* * * * *